(12) United States Patent
Bar-Zeev et al.

(10) Patent No.: US 10,068,486 B1
(45) Date of Patent: *Sep. 4, 2018

(54) TRANSPORTATION NETWORK UTILIZING MULTIPLE AUTONOMOUS VEHICLES TO TRANSPORT ITEMS BETWEEN NETWORK LOCATIONS

(71) Applicant: Amazon Technologies, Inc., Seattle, WA (US)

(72) Inventors: Avi Bar-Zeev, Oakland, CA (US); Brian C. Beckman, Newcastle, WA (US); Daniel Buchmueller, Seattle, WA (US); Steven Gregory Dunn, Bothell, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,410

(22) Filed: Sep. 6, 2017

Related U.S. Application Data

(63) Continuation of application No. 14/734,288, filed on Jun. 9, 2015, now Pat. No. 9,786,187.

(51) Int. Cl.
*G08G 5/00* (2006.01)
*G06Q 10/08* (2012.01)
(Continued)

(52) U.S. Cl.
CPC .............. *G08G 5/003* (2013.01); *G01C 21/00* (2013.01); *G06Q 10/08355* (2013.01);
(Continued)

(58) Field of Classification Search
CPC ............ B65G 1/0492; B64C 2201/128; G05D 2201/0216; G05D 1/0088; G06Q 10/0832; G08G 5/0069
(Continued)

(56) References Cited

U.S. PATENT DOCUMENTS 4,954,962 A 9/1990 Evans et al.
5,040,116 A 8/1991 Evans et al.
(Continued)

OTHER PUBLICATIONS

A novel nonlinear backstepping-based control approach for quadrotor unmanned aerial vehicle transportation systems; Xiao Liang et al.; 2017 36th Chinese Control Confererence; pp. 884-889; IEEE Conference Publications. (Year: 2017).*

(Continued)

*Primary Examiner* — Cuong H Nguyen
(74) *Attorney, Agent, or Firm* — Athorus, PLLC

(57) ABSTRACT

A transportation network is provided that utilizes autonomous vehicles (e.g., unmanned aerial vehicles) for identifying, acquiring, and transporting items between network locations without requiring human interaction. A travel path for an item through the transportation network may include multiple path segments and corresponding intermediate network locations, with a different autonomous vehicle utilized to transport the item along each path segment. Different possible next network locations for a travel path may selected based on transportation factors such as travel time, cost, safety, etc. (e.g., as may be related to distance, network congestion, inclement weather, etc.). Local processing (e.g., by a control system of an autonomous vehicle) may perform the selection of a next network location for a travel path (e.g., allowing multiple autonomous vehicles to simultaneously engage and depart with items or otherwise travel without having to contact and wait for instructions from centralized system components, etc.).

20 Claims, 12 Drawing Sheets

(51) Int. Cl.
*G01C 21/00* (2006.01)
*B65G 1/04* (2006.01)

(52) U.S. Cl.
CPC ...... *B64C 2201/128* (2013.01); *B65G 1/0492* (2013.01); *G05D 2201/0216* (2013.01); *G06Q 10/0832* (2013.01); *G08G 5/0069* (2013.01)

(58) Field of Classification Search
USPC .......... 701/11, 23, 25, 27, 36; 709/226, 245, 709/247–248, 216
See application file for complete search history.

(56) References Cited

U.S. PATENT DOCUMENTS

| | | | |
|---|---|---|---|
| 5,659,779 | A | 8/1997 | Laird et al. |
| 7,991,505 | B2* | 8/2011 | Lert, Jr. ............... B65G 1/0492 198/347.1 |
| 9,384,668 | B2 | 7/2016 | Raptopoulos et al. |
| 2003/0141411 | A1* | 7/2003 | Pandya ................... B64F 1/366 244/114 R |
| 2009/0074545 | A1* | 3/2009 | Lert, Jr. ............... B65G 1/0492 414/276 |
| 2009/0152391 | A1 | 6/2009 | McWhirk |
| 2013/0116908 | A1 | 5/2013 | Oh et al. |
| 2014/0022055 | A1* | 1/2014 | Levien ................. G05D 1/0011 340/5.64 |
| 2014/0032034 | A1 | 1/2014 | Raptopoulos et al. |
| 2014/0180914 | A1* | 6/2014 | Abhyanker .............. G01C 1/00 705/39 |
| 2014/0330456 | A1 | 11/2014 | Morales et al. |
| 2015/0071743 | A1* | 3/2015 | Lert, Jr. ............... B65G 1/0492 414/273 |
| 2015/0153175 | A1 | 6/2015 | Skaaksrud |
| 2015/0185034 | A1 | 7/2015 | Abhyanker |
| 2016/0163204 | A1 | 6/2016 | Raptopoulos et al. |
| 2016/0207709 | A1 | 7/2016 | Pankratov et al. |
| 2016/0299233 | A1* | 10/2016 | Levien ................... G01C 21/00 |
| 2016/0334229 | A1* | 11/2016 | Ross .................... G05D 1/0022 |

OTHER PUBLICATIONS

A hierarchical controller for quadrotor unmanned aerial vehicle transportation systems; Xiao Liang et al.;2016 35th Chinese Control Conference (CCC); IEEE Conference Publications. (Year: 2016).*
Agent Based Material Transfer Scheduling in Steel Works; Junji Kikuchi et al.;Second International Conference on Innovative Computing, Informatio and Control (ICICIC 2007); pp. 107: IEEE Conference Publications. (Year: 2007).*
Passivity analysis and design of passivity-based controllers for trajectory tracking at high speed of autonomous vehicles; Gilles Tagne et al.; 2014 IEEE Intelligent Vehicles Symposium Proceedings;pp. 1151-1156; IEEE Conference Publications. (Year: 2014).*
A novel nonlinear backstepping-based control approach for quadrotor unmanned aerial vehicle transportation systems Xiao Liang; Yongchun Fang; Ning Sun; 2017 36th Chinese Control Conference (CCC); 2017; pp. 884-889.*
An effective search and navigation model to an auto-recharging station of driverless vehicles; Chaomin Luo; Yu-Ting Wu; Mohan Krishnan; Mark Paulik; Gene Eu Jan; Jiyong Gao; 2014 IEEE Symposium on Computational Intelligence in Vehicles and Transportation Systems (CIVTS); Year: 2014; pp. 100-107, DOI: 10.1109/CIVTS.2014.7009484.
Bodanese, J.P. et al. "RBESP: Reliable and best effort stack protocol for Uav collaboration with WSN", Industrial Informatics (INDIN), 2014 12th IEEE International Conference on; Year 2014; pp. 382-387, DOI: 10.1109/INDIN.2014.6945543.
Bodanese, J.P. et al. "Wireless Communication Infrastructure for a Short-Range Unmanned Aerial"; Advanced Information Networking and Applications Workshops (WAINA), 2014 28th International Conference on; Year 2014; pp. 492-497, DOI: 10.1109/WAINA2014.154.
Ciarletta, L. Simulation and platform tools to develop safe flock of UAV's: a CPS application-driven research; Unmanned Aircraft Systems (ICUAS), 2014 International Conference on; Year 2014; pp. 95-102, DOI: 10.1109/ICUAS.2014.6842244.
Communication provision for a team of remotely searching UAVs: A mobile relay approach; Chunbo Luo; Paul Ward; Stephen Cameron; Gerard Parr Sally McClean; 2012 IEEE Globecom Workshops; Year: 2012; pp. 1544-1549, DOI: 10.1109/GLOCOMW.2012.6477815.
Guerra, F. et al., "Performance evaluation of random and handshake-based channel access in collaborative mobile underwater networks",OCEANS 2010 MTS/IEEE Seattle, Year: 2010 pp. 1-7, DOI: 10.1109/OCEANS.2010.5664369.
Horiuchi, M. et al., "Throughput maximization for long-distance real-time data transmission over multiple UAVs", 2016 IEEE International Conference on Communications (ICC); Year: 2016 pp. 1-6, DOI: 10.1109/ICC.2016.7510735.
Improvement methods of short range and low bandwidth communication for small range UAVs; D. Stojcsics; L Somlyai; IEEE 8th International Symposium on Intelligent Systems and Informatics; Year: 2010; pp. 93-97, DOI: 10.1109/SISY.2010.5647224.
Pizetta, Beloti et al, "A hardware in-loop platform for rotary-wing unmanned aerial vehicles"; Unmanned Aircraft Systems (ICUAS), 2014 International Conference on; Year 2014; pp. 1146-1157, DOI: 10.1109/ICUAS.2014.6842369.
Placement of UAVs as Communication Relays Aiding Mobile Ad Hoc Wireless Networks; Izhak Rubin; Runhe Zhang; MILCOM 2007—IEEE Military Communications Conference; Year: 2007; pp. 1-7, DOI: 10.1109/MILCOM.2007.4455114.
Team Planning for Unmanned Vehicles in the Risk-Aware Mixed-Initiative Dynamic Replanning System; John Wilde; Dino DiBiaso; Margaret Nervegna; OCEANS 2007; Year: 2007; pp. 1-8, DOI: 10.1109/OCEANS.2007.4449143.
Waldmann, C., "The challenge of exploring extreme ecosystems in the oceans", OCEANS '04. MTTS/IEEE TECHNO-OCEAN '04 Year: 2004, vol. 1; p. 8 vol. 1, DOI: 10.1109/OCEANS.2004.1402886.

* cited by examiner

TRANSPORTATION NETWORK UTILIZING MULTIPLE AUTONOMOUS VEHICLES TO TRANSPORT ITEMS BETWEEN NETWORK LOCATIONS

PRIORITY CLAIM

This application is a continuation of U.S. patent application Ser. No. 14/734,288, filed Jun. 9, 2015, entitled "Transportation Network Utilizing Autonomous Vehicles For Transporting Items," which is incorporated herein by reference in its entirety.

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a building including a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. The delivery of physical items to a customer's specified location is traditionally accomplished using a delivery system including a human controlled truck, bicycle, cart, etc. For example, a customer may order an item for delivery to their home. The item may be picked by a human agent from a materials handling facility, packed and shipped to the customer for final delivery by a shipping carrier, such as the United States Postal Service, FedEx, or UPS. An agent of the shipping carrier will load the item onto a truck that is driven to the final delivery location and a driver, or another human companion with the driver, will retrieve the item from the truck and complete the delivery to the destination. Over time, an increasing frequency and volume of deliveries of items from e-commerce and mail-order companies has resulted in an increased need for faster and more efficient delivery methods.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
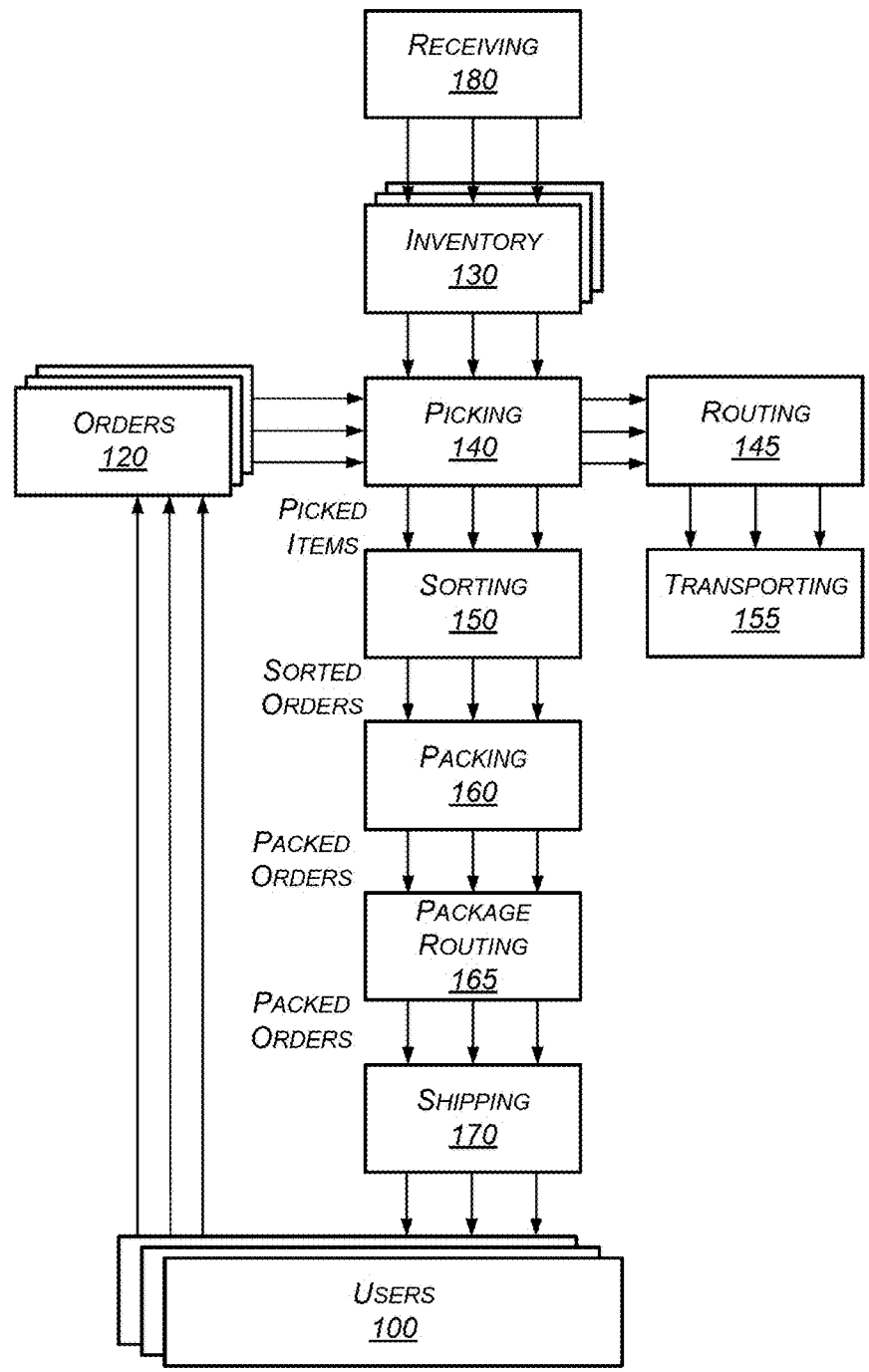
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes a transportation network that utilizes autonomous vehicles (e.g., unmanned aerial vehicles) for acquiring and transporting items between network locations without requiring human interaction. A travel path for an item through the transportation network may include a passing of the item from one autonomous vehicle to another or otherwise utilizing different autonomous vehicles for transporting the item along different path segments (e.g., between different network locations). In some instances, the different network locations may include temporary meeting locations where two autonomous vehicles meet for passing the item from one autonomous vehicle to another. In various implementations, different types of network locations may have different characteristics. For example, certain network locations may include associated autonomous vehicles that are available for transporting items from the network locations. Certain network locations may also or alternatively include charging and/or servicing areas for autonomous vehicles and storage areas where items may be dropped off by one autonomous vehicle for pickup and further transport at a later time by another autonomous vehicle.

In various implementations, different possible travel paths may be available for the transport of an item from an origin network location (e.g., at a materials handling facility) to a destination network location (e.g., at a user-specified delivery location). In such instances, the different possible travel paths may be evaluated, and a travel path for the item may be selected based on various transportation factors. For example, one of the transportation factors may be a timing factor that is related to an estimated amount of time that it would take for the item to be transported along the corresponding travel path, and a travel path may be selected in accordance with having a shortest associated travel time. As another example, one of the transportation factors may be a cost factor that is related to an estimated amount of cost that would be associated with the transport of the item along the corresponding travel path, and a travel path may be selected in accordance with having a lowest associated transportation cost. As other examples, other transportation factors may be related to a safety score, a noise-abatement score, a traffic-congestion score, a visual pollution score, etc. In various implementations, a selection may also be made based on a combination of transportation factors. For example, each of the transportation factors may be assigned a weighted value, for which the selection of the travel path for the item may be made based on an optimized combination of the transportation factors. In various implementations, the consideration of the transportation factors may be made according to a computation of a cost function and/or a subsequent path optimization algorithm may be utilized for selecting the travel path. In various implementations, the processing related to the selection of the travel path may be performed at a central location or may be done in a distributed fashion. For example, the processing may be performed by a centralized computing system, or may be performed by control systems of the autonomous vehicles, network locations, and/or other distributed computing systems, or may be performed by a combination of such systems.

In various implementations, when a transportation network is initially configured, the distances between network locations may be determined in part by the maximum travel ranges of the autonomous vehicles that will be utilized for transporting items. For example, it may be preferable to space the network locations at distances that are no more than the maximum effective travel range of a type of autonomous vehicle that will be utilized. In various implementations, autonomous vehicles with different travel ranges may also be utilized in a transportation network. In such instances, the distances between the network locations may be more variable, although for longer distances only certain autonomous vehicles with longer travel ranges may be able to be utilized.

In various implementations, in addition to utilizing autonomous vehicles with different travel ranges, autonomous vehicles may also be utilized that have other differences in capabilities. For example, different autonomous vehicles with different carrying capacities may be utilized for carrying certain numbers of items or items of certain sizes and/or weights. More specifically, in one example a relatively larger type of autonomous vehicle may be utilized for transporting numerous items to an intermediate network location, while relatively smaller autonomous vehicles may then be utilized for transporting smaller groups or individual items to destination network locations (e.g., delivery locations). As another example, different autonomous vehicles may have different travel speeds, wherein faster autonomous vehicles may be utilized to transport higher priority items more quickly. As another example, different types of autonomous vehicles that utilize different modes of transport (e.g., flying versus ground travel) may provide options when certain conditions occur (e.g., flying over an area that is experiencing rush hour traffic). It will be appreciated that the inclusion of autonomous vehicles with different capabilities may increase the efficiency and flexibility of the system for transporting items.

In various implementations, updated transportation information may be received that affects various transportation factors. For example, weather conditions, delays due to congestion, etc. may be relevant to a timing factor for determining and/or updating an estimated amount of time that would be associated with transporting an item along a travel path. In various implementations, a planned travel path for an item may be modified based on such updated transportation information. For example, if a path segment to a particular network location is determined to be inhibited (e.g., due to weather conditions, congestion occurring at the network location, etc.), the travel path may be rerouted to no longer include that path segment.

It will be appreciated that such transportation networks may also provide various advantages in regions where infrastructure for transportation is limited. For example, in a region with limited roadways, etc., network locations may be established at selected positions across the region. Such positioning of network locations may allow certain types of autonomous vehicles (e.g., unmanned aerial vehicles) to transport items over path segments between the network locations for delivering items to remote locations (e.g., rural villages with limited roadways, etc.).

A block diagram of a materials handling facility which, in one implementation, may be an order fulfillment facility configured to utilize various systems and methods described herein (e.g., with regard to the utilization of autonomous vehicles for delivering items to users), is illustrated in FIG. 1. In this example, multiple users 100 may submit orders 120, where each order 120 specifies one or more items from inventory 130 to be shipped or otherwise delivered (e.g., by an autonomous vehicle) to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when an autonomous vehicle, such as the autonomous vehicle described below with respect to FIG. 4, has been designated for a delivery, the item(s) of one or more shipment sets may be picked at the picking operation 140 and sent to a routing operation 145. In various implementations, the autonomous vehicles may each include a unique identifier, such as a bar code, QR code, unique number, etc., to enable tracking, identification, and/or association of items to be carried by each autonomous vehicle. For example, during a picking operation, an agent or automated system (e.g., robotic) within the materials handling facility may scan the bar code of the autonomous vehicle or a container that the autonomous vehicle will carry and/or scan a barcode or identifier of the picked item as the item is picked and/or placed into the autonomous vehicle or container. Alternatively, the autonomous vehicle itself may have the capability to engage and/or scan or otherwise acquire information regarding an item and/or container holding an item that is to be transported. Scanning of the autonomous vehicle, container, and/or the picked item may be utilized to associate and track the item with the autonomous vehicle. As the autonomous vehicles and/or containers that the autonomous vehicles will carry are filled, the routing operation 145 may route the autonomous vehicles and/or containers to an appropriate transporting operation 155 from which the autonomous vehicles may depart and begin to travel along designated travel paths. The travel paths may include multiple path segments, wherein a different autonomous vehicle may be utilized for transporting an item along each path segment, as will be described in more detail below with respect to FIG. 3.

In other examples, some picked items may be delivered to one or more stations in the order-fulfillment facility for sorting 150 into their respective shipment sets and for packing 160 in shipping packages. A package-routing operation 165 may sort orders for packing in shipping packages to one of two or more shipping operations 170, from which they may be shipped to the users 100. In various implementations, autonomous vehicles may be utilized for the shipping and may be considered as an alternative to shipping by traditional carriers. Depending on the specific implementation, the package routing operation 165 may be either automated or manual. The package-routing operation 165 may receive an indication of the destination to which each packed shipment set should be routed from a central control system. In some instances, the destination may be the final destination identified by the user or a destination at which transfer of a shipment set may occur for final delivery to the user. The package routing operation 165 may also determine a routing destination for each packed shipment set dependent on the size of a shipping package in which the shipment set is contained and/or based on whether the shipment set will be delivered by a traditional carrier or an autonomous vehicle.

The arrangement and order of operations illustrated by FIG. 1 is merely one example of many possible implementations of the operation of a materials-handling facility, such as an order-fulfillment facility, that enables fulfillment of user orders. Other types of materials handling, manufacturing, or order fulfillment facilities may include different, fewer, or additional operations and resources, according to different implementations.

Figure 2:
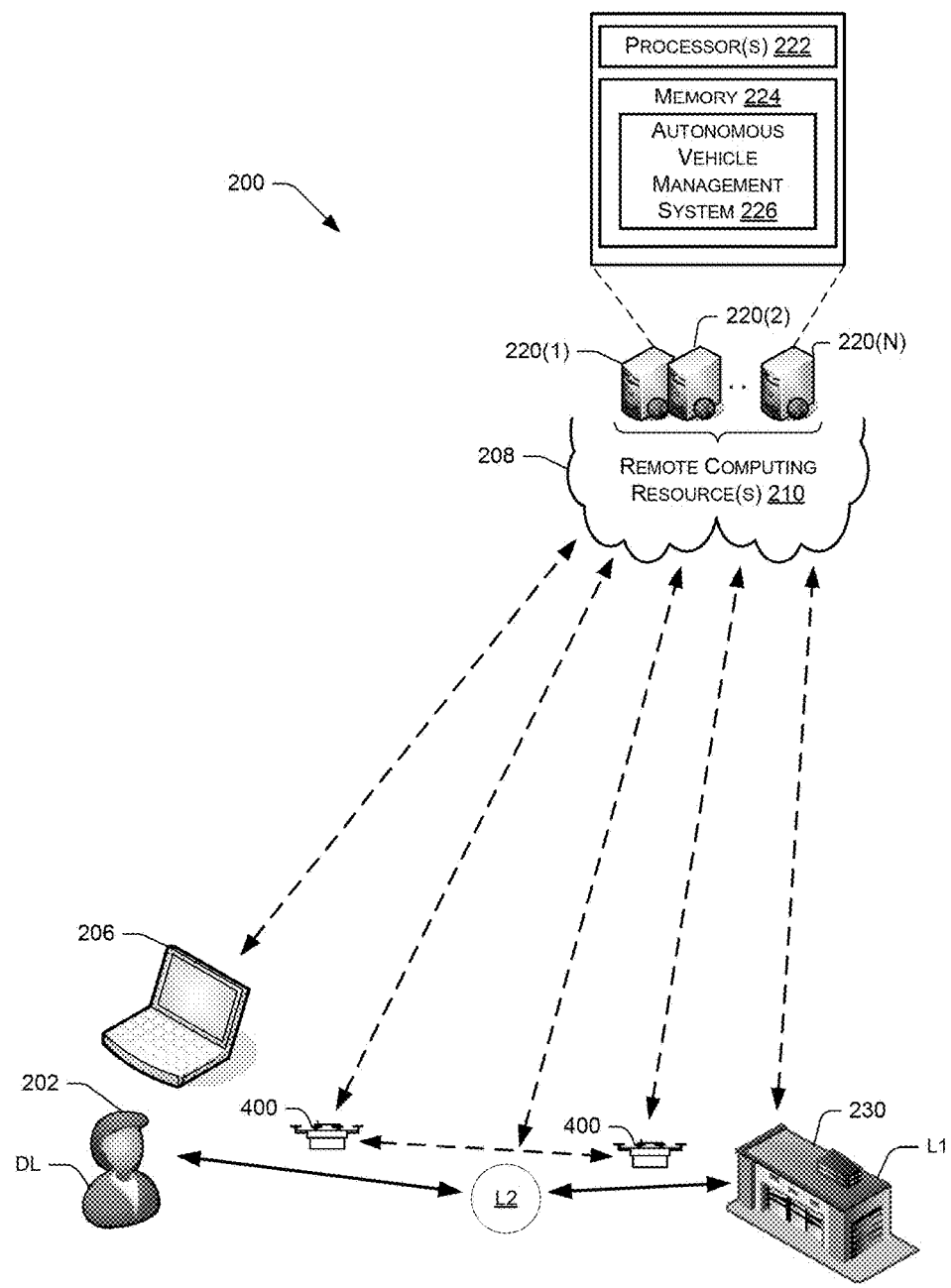
FIG. 2 depicts a block diagram of an autonomous vehicle environment, according to some implementations.

FIG. 2 is a block diagram of an illustrative autonomous vehicle environment 200 that includes a user interface that allows a user 202 to place an order for an item. As will be described in more detail below, the ordered item may be transported by one or more autonomous vehicles 400 to a delivery location DL (e.g., at a user's home or business which may be designated as a destination network location). In various implementations, the autonomous vehicles 400 may be unmanned aerial vehicles (e.g., as will be described in more detail below with respect to FIGS. 4-6), or other types of aircraft, automobiles, trucks, watercraft, or any other types of mobile autonomous vehicles. The user interface that allows the user 202 to place the order may be a graphical user interface, an audio only interface, a multi-mode interface, or any other interface for interacting with the user 202. The user interface may be provided to the user 202 through any type of electronic device 206, such as a tablet, desktop, laptop, smart phone, personal digital assistant, netbook, etc. The user interface may be delivered to the electronic device 206 by one or more remote computing resources 210 that make up part or all of an electronic commerce-shopping environment. In other embodiments, the user interface may include direct communication between a user and an agent.

The remote computing resources 210 may form a portion of a network-accessible computing platform implemented as a computing infrastructure of processors, storage, software, data access, and other components that is maintained and accessible via a network 208. Services, such as e-commerce shopping services, offered by the remote computing resources 210 do not require that the user have knowledge of the physical location and configuration of the system that delivers the services. The electronic device 206 may communicatively couple to the remote computing resources 210 via the network 208, which may represent wired technologies (e.g., wires, USB, fiber optic cable, etc.), wireless technologies (e.g., RF, cellular, satellite, Bluetooth, etc.), and/or other connection technologies. The network 208 carries data between the electronic device 206 and the remote computing resources 210.

After receiving from a user 202 an order for an item that may be transported by one or more autonomous vehicles 400 from the materials-handling facility 230 to a delivery location DL, the electronic device 206 may send this information to the remote computing resources 210 over the network 208. As illustrated, the remote computing resources 210 may include one or more servers, such as servers 220(1), 220(2) . . . 220(N). These servers 220(1)-(N) may be arranged in any number of ways, such as server farms, stacks, and the like that are commonly used in data centers. Furthermore, the servers 220(1)-(N) may include one or more processors 222 and memory 224 that may store an autonomous vehicle management system 226. The autonomous vehicle management system 226 may be configured, for example, to perform order planning and filling of autonomous vehicles 400 with orders (e.g., at a materials handling facility 230) and/or scheduling of deliveries by autonomous vehicles 400 to user specified delivery locations. In fulfilling orders that may be transported by one or more autonomous vehicles 400, the materials handling facility 230 may fulfill orders using any of the processes discussed above with respect to FIG. 1.

The autonomous vehicles 400 may communicatively couple to the remote computing resources 210 via the network 208. For example, the communications to and from the autonomous vehicles 400 may utilize wireless antennas of the autonomous vehicles. Communications may be to and from a control system of each of the autonomous vehicles 400 (as described below with respect to FIG. 7). The autonomous vehicles 400 and/or network locations may also communicatively couple to each other (as described in more detail below with respect to FIG. 3).

The autonomous vehicle management system 226 may also be configured, for example, to communicate with the autonomous vehicles 400 and/or network locations. In various implementations, the general activities of autonomous vehicles 400, including those related to the travel of the autonomous vehicles and the delivery and receiving of items by the autonomous vehicles, may be recorded, monitored, coordinated, and/or partially or otherwise controlled by the autonomous vehicle management system 226. For example, the autonomous vehicles 400 and/or the autonomous vehicle management system 226 may monitor and/or determine travel paths for items between various network locations, wherein the items will be transported by autonomous vehicles 400, as will be described in more detail below with respect to FIG. 3. In various implementations, the autonomous vehicle management system 226 may send instructions, needed information (e.g., regarding items, network locations, travel paths, etc.), and/or otherwise partially or completely control the autonomous vehicles 400 for delivering and/or receiving items, travelling between network locations, etc. As an example, information and/or instructions may be transmitted to an autonomous vehicle 400 that indicates an identification, destination network location, and/or other travel path information for an item.

In various implementations, the remote computing resources 210 and/or autonomous vehicle management system 226 may also receive tracking data (e.g., GPS) regarding the coordinates of the autonomous vehicles 400. The GPS data may be utilized for various purposes, such as planning meeting locations, answering location status requests, sending notifications regarding the current locations of the autonomous vehicles, etc. For example, a user may request that a notification be sent when an autonomous vehicle 400 with an ordered item is approaching. As another example, notifications may be sent to autonomous vehicles 400 when they are approaching a meeting location where an item will be transferred from one autonomous vehicle to another. Notifications may also be sent from autonomous vehicles 400 to the remote computing resources 210 and/or autonomous vehicle management system 226 regarding various events (e.g., when an autonomous vehicle has departed from a network location and has begun to travel along a path segment, when an autonomous vehicle has delivered an item, when an autonomous vehicle is approaching a meeting location or other network location, etc.).

As will be described in more detail below with respect to FIG. 3, in various implementations items may be passed from one autonomous vehicle to another or otherwise transferred for transport by different autonomous vehicles along different path segments through a transportation network. For example, as illustrated in FIG. 2, a travel path for an item may include transport by a first autonomous vehicle 400 along a path segment from a network location L1 (e.g., the materials handling facility 230) to a network location L2. In this configuration, with respect to the transport of the designated item, the network location L1 may be designated as an origin network location and the network location L2 may be designated as an intermediate network location along the travel path for the item. In various implementations, the network location L2 may be a meeting location where the first autonomous vehicle 400 will transfer the item to a second autonomous vehicle 400. In other instances, the network location L2 may include a storage area, where the first autonomous vehicle 400 may drop off the item, and from which the item may later be picked up by a second autonomous vehicle 400 for further transport. In either case, the second autonomous vehicle 400 may be utilized to transport the item along a path segment from the network location L2 to a delivery location DL (e.g., where the user 202 is located, such as at the user's home or business). The delivery location DL may be designated as a destination network location for the item. As will be described in more detail below with respect to FIG. 3, a travel path for an item may be selected from multiple possible travel paths through the transportation network based on various transportation factors (e.g., travel time, cost, safety, etc.).

Figure 3:
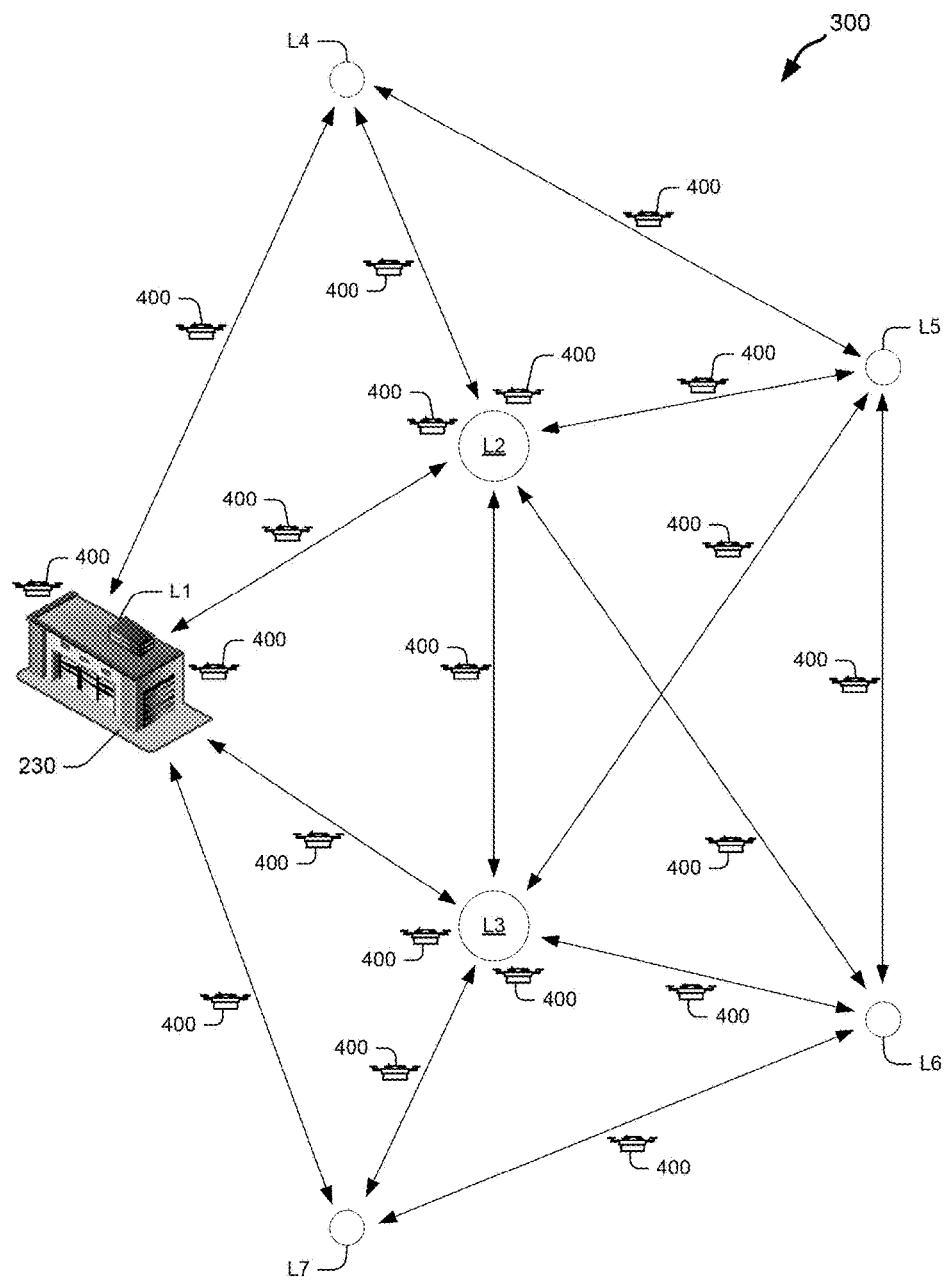
FIG. 3 depicts a block diagram illustrating a transportation network utilizing autonomous vehicles for transporting items, according to some implementations.

FIG. 3 depicts a block diagram illustrating a transportation network 300 utilizing autonomous vehicles 400 for transporting items, according to some implementations. As shown in FIG. 3, the autonomous vehicles 400 may transport items along path segments indicated by solid line arrows between various network locations L1-L7 of the transportation network 300. As will be described in more detail below, for different travel paths each of the network locations L1-L7 may be designated as either an origin network location, an intermediate network location, or a destination network location.

As a first example of a travel path, an item from a network location L1 (e.g., a materials handling facility 230) may be ordered by a user for delivery to a network location L5 (e.g., at the user's home, place of business, etc.). The network location L1 may thus be designated as an origin network location and the network location L5 may thus be designated as a destination network location with respect to the possible travel paths for the item. The different possible travel paths may include different intermediate network locations (e.g., network locations L2, L3, L4, etc.), which may have different characteristics. For example, in one configuration, the network locations L2 and L3 may include associated autonomous vehicles that are available for transporting items from the network locations L2 and L3, as well as possibly including charging and/or servicing areas for autonomous vehicles and storage areas where items may be dropped off by one autonomous vehicle for pickup and further transport by another autonomous vehicle. In contrast, the network location L4 may correspond to a temporary network location that may be arranged as a meeting location for two autonomous vehicles for transferring the item. The utilization of these different types of network locations will be described in more detail below with respect to the different possible travel paths between the network location L1 and the network location L5.

A first possible travel path for the item in this first example may include utilizing a first autonomous vehicle 400 to transport the item along a path segment from the network location L1 to the network location L2, and then utilizing a second autonomous vehicle 400 (e.g., which may be stationed at or otherwise associated with the network location L2) to transport the item along a path segment from the network location L2 to the network location L5. A second possible travel path for the item may include utilizing a first autonomous vehicle 400 to transport the item along a path segment from the network location L1 to the network location L3, and then utilizing a second autonomous vehicle 400 (e.g., which may be stationed at or otherwise associated with the network location L3) to transport the item along a path segment from the network location L3 to the network location L5. As noted above, the network locations L2 and L3 may include various types of facilities for autonomous vehicles (e.g., charging areas, servicing areas, storage areas, etc.).

A third possible travel path for the item may include utilizing a first autonomous vehicle 400 to transport the item along a path segment from the network location L1 to the network location L4 (e.g., which may be established as a temporary meeting location), and then utilizing a second autonomous vehicle 400 (e.g., which may meet the first autonomous vehicle 400 at the network location L4 for transferring the item) to subsequently transport the item along a path segment from the network location L4 to the network location L5. In various implementations, other possible travel paths for an item may also include multiple intermediate network locations. For example, a fourth possible travel path for the item may include utilizing a first autonomous vehicle 400 to transport the item along a path segment from the network location L1 to the network location L2, and then utilizing a second autonomous vehicle 400 to transport the item along a path segment from the network location L2 to the network location L3, and then utilizing a third autonomous vehicle 400 to transport the item along a path segment from the network location L3 to the network location L5. In this particular example, such a travel path may be utilized if transportation information is received indicating that various circumstances or conditions are occurring that may inhibit or otherwise prevent efficient travel of an autonomous vehicle along certain more direct path segments. More specifically, in this particular example, transportation information may be received that indicates that the individual path segments between the network locations L1-L3 and/or between the network locations L2-L5 may be experiencing adverse conditions (e.g., inclement weather, congestion, etc.), which may result in the travel path through the network locations L1-L2-L3-L5 being determined to be more efficient.

Similar sets of example travel paths may also be envisioned with respect to other potential destination network locations (e.g., the network location L6 may alternatively be designated as a delivery location by a user). In such a case, a first possible travel path may include the network locations L1-L3-L6, a second possible travel path may include the network locations L1-L2-L6, a third possible travel path may include the network locations L1-L7-L6, a fourth possible travel path may include the network locations L1-L2-L3-L6, a fifth possible travel path may include the network locations L1-L3-L2-L6, etc. In various implementations, all of these possible travel paths may also be reversed (e.g., for when a user is returning an item from the network location L5 or L6). In such instances, the network location L5 or the network location L6 may be designated as an origin network location, and the network location L1 may be designated as a destination network location, with all of the above-described possible travel paths correspondingly reversed.

In various implementations, some travel paths for an item may be short enough that an intermediate network location is not required. For example, an item from the network location L1 may be ordered by a user for delivery to the network location L4. In such an instance, a first possible travel path may include the network locations L1-L4, which correspondingly includes only a single path segment. However, it will be appreciated that even in such a circumstance, other possible travel paths may also be considered. For example, as noted above there may be various types of adverse conditions (e.g., inclement weather, congestion, etc.) which may affect the path segment between the network locations L1-L4, which may make other possible travel paths more efficient. Therefore, in this case, a second possible travel path may include the network locations L1-L2-L4, a third possible travel path may include the network locations L1-L3-L2-L4, etc.

As will be described in more detail below with respect to FIG. 10, in various implementations, when different possible travel paths are available for the transport of an item, one of the possible travel paths may be selected based on various transportation factors. For example, one of the transportation factors may be a timing factor that is related to an estimated amount of time that it would take for the item to be transported along the corresponding travel path, and a travel path may be selected in accordance with having a shortest associated travel time. As another example, one of the transportation factors may be a cost factor that is related to an estimated amount of cost that would be associated with the transport of the item along the corresponding travel path, and a travel path may be selected in accordance with having a lowest associated transportation cost. As another example, one of the transportation factors may be a safety factor that is related to a concern for safety that is associated with the transport of the item along the corresponding travel path, and certain possible travel paths may be eliminated from consideration due to safety concerns. As will further be described in more detail below with respect to FIG. 10, in various implementations these and other types of transportation factors may be assigned weighted values, which may allow for an optimized combination of various transportation factors to be determined when selecting a travel path.

In various implementations, when a transportation network (e.g., the transportation network 300) is configured, the distances between network locations may be determined in part in accordance with the maximum travel ranges of the autonomous vehicles that are to be utilized for transporting items. For example, if a maximum effective travel range of a type of autonomous vehicle that will be utilized is approximately one mile, it may be preferable to space the network locations at distances that are no more than one mile apart. In various implementations, autonomous vehicles with different travel ranges may also be utilized in a transportation network. In such instances, the distances between the network locations may be more variable, although for longer distances only certain autonomous vehicles may be able to be utilized that have sufficient travel ranges. Autonomous vehicles with longer travel ranges may also provide more flexibility for planned travel paths, such as capability to "skip" an intermediate network location and to correspondingly be able to transport the item to a further next network location without needing to stop and transfer the item to another autonomous vehicle.

In various implementations, in addition to utilizing autonomous vehicles with different travel ranges, autonomous vehicles may also be utilized that have other differences in capabilities. For example, different autonomous vehicles may have different carrying capacities, wherein only certain autonomous vehicles may be utilized for carrying certain numbers of items or items of certain sizes and/or weights. More specifically, in one example a relatively larger type of autonomous vehicle may be able to transport numerous items, such as may be transported to an intermediate network location, while relatively smaller autonomous vehicles may then be utilized to transport smaller groups or individual items to destination network locations (e.g., delivery locations). As another example, different autonomous vehicles may have different travel speeds, wherein faster autonomous vehicles may be utilized to transport higher priority items more quickly. As another example, different types of autonomous vehicles that utilize different modes of transport (e.g., flying versus ground travel) may provide options when certain conditions occur (e.g., flying over an area that is experiencing rush hour traffic). It will be appreciated that the inclusion of autonomous vehicles with different capabilities may increase the efficiency and flexibility of the system for transporting items.

In various implementations, a capacity that is associated with a network location for transporting items may be based on a number of factors. For example, the capacity of an intermediate network location for subsequently transporting incoming items may be determined at least in part according to the number of autonomous vehicles that are either stationed at or otherwise associated with the intermediate network location and which are ready (e.g., recharged) and available for transporting incoming items. The capacity of an intermediate network location may also be related to an amount of space that is available at the intermediate network location for various functions related to incoming and departing items. For example, the size of a receiving or departure area where autonomous vehicles may park or land may determine a maximum number of autonomous vehicles that may be at the intermediate network location at a given time. In such cases, when a receiving or departure area is full (e.g., which may correspond to a type of congestion), any additional incoming autonomous vehicles may need to wait before they can park or land, which may add to an estimated travel time for an item. As a similar issue, an intermediate network location may have a limited amount of storage areas where items may be dropped off and/or stored while waiting for pick up and subsequent transport by other autonomous vehicles. In such instances, when the storage areas are full (e.g., which may correspond to a type of congestion), any additional incoming autonomous vehicles may need to wait before they can drop off items, which may add to an estimated travel time for an item. As noted above, capacity issues of these types may affect the estimated travel time for an item, for which travel paths may be selected so as to route more items through intermediate network locations that currently have a greater available capacity (e.g., with less congestion occurring, more available autonomous vehicles for subsequently transporting incoming items, etc.).

In various implementations, updated transportation information regarding various transportation factors may be received from autonomous vehicles, network locations, sensors, etc. within the transportation network. For example, the autonomous vehicles that are currently traveling in an area may have capabilities for reporting transportation information such as weather conditions, delays due to congestion, etc. In addition, autonomous vehicles may also communicate regarding changes in a travel path for an item. For example, if a power module of an autonomous vehicle is running low on energy, the autonomous vehicle may send a communication requesting that a temporary meeting location be established (e.g., designated as an intermediate network location) where the autonomous vehicle may meet another autonomous vehicle for transferring the item for further transport.

In various implementations, certain network locations of the transportation network may include various types of facilities or capabilities that may be utilized by the autonomous vehicles. For example, as noted above, certain network locations may include charging areas, servicing areas, storage areas, etc. In various implementations, charging areas may include various types of charging components (e.g., plugs, inductive chargers, etc.) which may couple to corresponding charging components on autonomous vehicles to allow the autonomous vehicles to recharge power modules at the network locations. Alternatively or in addition, certain types of charging areas may utilize naturally occurring conditions to facilitate the recharging (e.g., an area that receives sunlight for recharging solar panels, a windy area for rotating a propeller or turbine for generating electricity, etc.). In various implementations, some types of servicing areas may include human agents or automated (e.g., robotic) mechanisms for performing servicing functions for the autonomous vehicles (e.g., to address mechanical malfunctions, swap batteries, etc.).

In various implementations, machine learning, algorithms, and/or other techniques may be utilized to predict the capacity needs of the transportation network with respect to various network locations. In response to such determinations, various adjustments may be made for certain network locations. For example, in response to an indication that a selected travel path for an item will include a designated intermediate network location, an autonomous vehicle that is not currently transporting an item may be directed to travel to the designated intermediate network location before the item arrives and to utilize a charging component to recharge a power module in preparation for transporting the item from the designated intermediate network location. As another example, if over time an intermediate network location is determined to regularly be experiencing congestion due to an insufficient number of available autonomous vehicles for subsequently transporting incoming items, additional autonomous vehicles may be instructed to move to the intermediate network location. As another example, if it is known that a network location will temporarily need additional capacity (e.g., due to a sporting event occurring in the area, such as a football game occurring on a Sunday, etc.) additional autonomous vehicles may be directed to travel to the network location in advance (e.g., the day before the event), so that the autonomous vehicles will have time to utilize charging components to recharge power modules and be available to transport items (e.g., sports paraphernalia) when the additional capacity is needed.

In various implementations, at least some of the functions related to the transportation of items by autonomous vehicles (e.g., such as the determination and selection of travel paths for items, etc.) may be performed at least in part by a centralized control system. For example, a centralized autonomous vehicle management system 226 may perform some or all of these types of functions. Alternatively, some or all of these types of functions may be performed utilizing local processing. For example, control systems of the autonomous vehicles, network locations and/or localized autonomous vehicle management systems 226 may be utilized for performing some or all of these types of functions. This type of local processing may have certain advantages, such as allowing the overall transportation network to continue to function even if broader network functions or communications become limited or unavailable in certain areas. Such local processing may also improve response times and help avoid overloaded centralized system components (e.g., allowing large groups of autonomous vehicles to simultaneously perform functions such as engaging and departing with items without having to sequentially contact and wait for instructions/determinations from centralized system components).

In various implementations, the network locations may also utilize various safety protocols with respect to the autonomous vehicles. For example, a network location that receives incoming items from unknown sources may require an autonomous vehicle to wait in a specified area or at a specified distance from the network location until the autonomous vehicle has been cleared for delivering the item to the network location. Such protocols may be utilized for ensuring the safety of the network location.

It will be appreciated that a transportation network of the type illustrated in FIG. 3 may also provide various advantages in regions where infrastructure for transportation is limited. For example, in a region with limited roadways, etc., network locations (e.g., including intermediate network locations) may be established at selected positions across the region. Such positioning of network locations may allow certain types of autonomous vehicles (e.g., unmanned aerial vehicles) to transport items over path segments between network locations for delivering items to remote locations (e.g., rural villages with limited roadways, etc.).

As noted above, in various implementations the autonomous vehicles 400 and/or network locations may communicatively couple to each other. As will be described in more detail below, such communications may include information related to travel paths, the transportation of items, coordination between the autonomous vehicles 400 and/or network locations, as well as other types of information. In various implementations, a group of the autonomous vehicles 400 and/or network locations may be configured to form a type of distributed network in which the different components communicate with one another (e.g., utilizing wired or wireless means of communication). As an example utilizing wireless communication, a type of wireless mesh network may be formed (e.g., utilizing Wi-Fi, cellular, satellite and/or other types of wireless communication), with each autonomous vehicle 400 and/or network location communicating with other autonomous vehicles 400 and/or other network locations within wireless range. In various implementations, such a distributed network and/or the individual autonomous vehicles 400 and/or individual network locations may be used to deliver information and/or content to each other and/or other computing resources, such as personal computers, electronic book reading devices, audio players, mobile telephones, tablets, desktops, laptops, etc. For example, the distributed network and/or individual autonomous vehicles 400 and/or individual network locations may be used to deliver electronic book content to electronic book reading devices of customers (e.g., including delivery to remote delivery locations by autonomous vehicles 400 that travel to or near the remote delivery locations).

In general, the components of the network 300 (e.g., including the autonomous vehicles 400 and the network locations) may be configured for enabling communications such as those described above between the various components, as well as for enabling the physical routing of items through the network as transported by the autonomous vehicles, as also described above. As will be described in more detail below, various methods, protocols, algorithms, etc. may be utilized with regard to the physical routing and transportation of items, as well as the communications between the various components. For example, certain techniques may be utilized which may be similar to those utilized for other types of systems (e.g., internet protocols, packet switching, Paxos, etc.). Such techniques may be modified and/or adapted and/or other techniques may be provided for enabling, managing, prioritizing, and/or optimizing the physical transportation of items and the communications between the various network components, as will be described in more detail below with respect to FIGS. 8-11.

Figure 4:
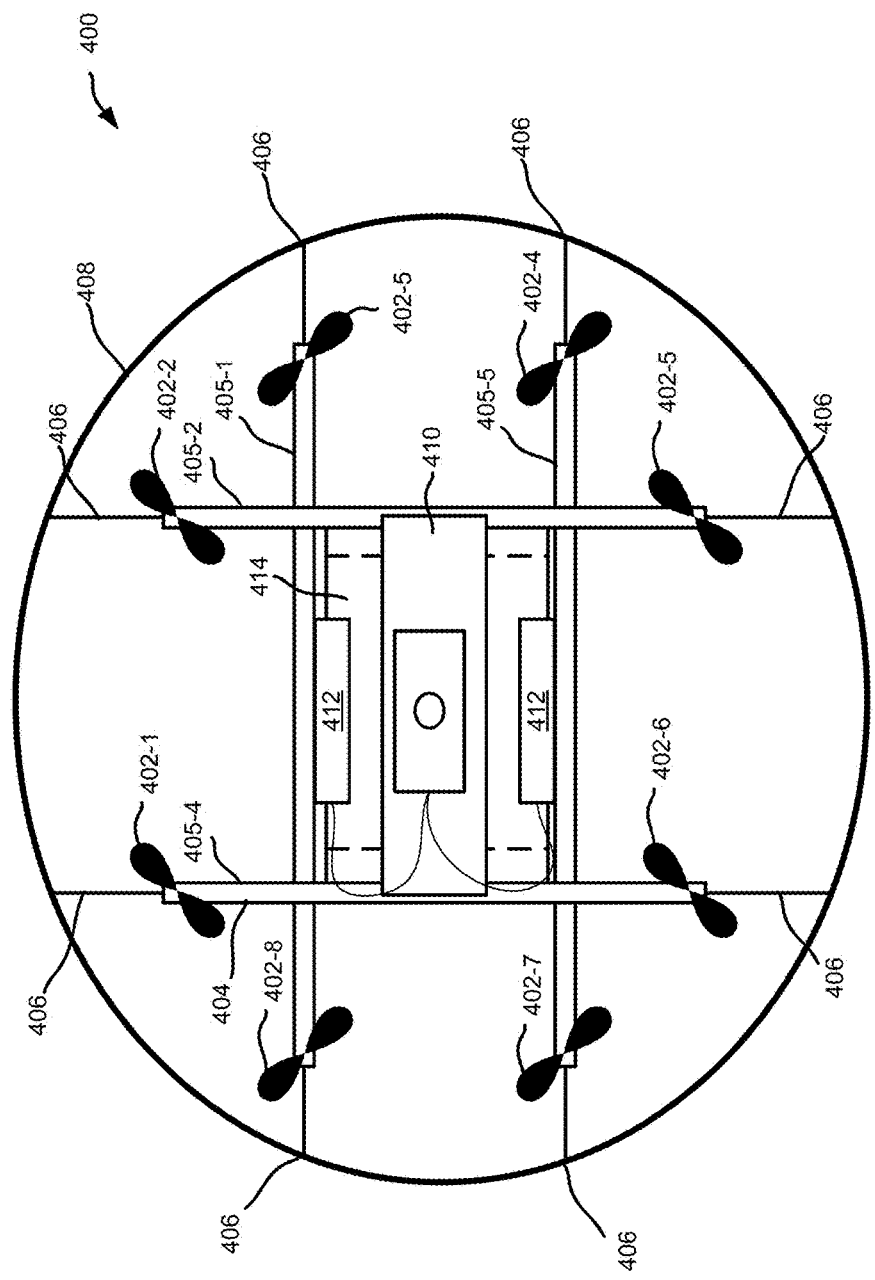
FIG. 4 depicts a block diagram of a top-down view of an autonomous vehicle, according to an implementation.

FIG. 4 illustrates a block diagram of a top-down view of an autonomous vehicle 400 in the form of an unmanned aerial vehicle (also referred to herein as a "UAV"), according to an implementation. As illustrated, the autonomous vehicle 400 includes eight propellers 402-1, 402-2, 402-3, 402-4, 402-5, 402-6, 402-7, 402-8 spaced about the frame 404 of the autonomous vehicle as part of a propulsion system for the autonomous vehicle 400. The propellers 402 may be any form of propeller (e.g., graphite, carbon fiber) and of a size sufficient to lift and fly the autonomous vehicle 400 and any item engaged by the autonomous vehicle 400 so that the autonomous vehicle 400 can navigate through the air, for example, to deliver an item to or from a user specified location. While this example includes eight propellers, in other implementations, more or fewer propellers may be utilized. Likewise, in some implementations, the propellers may be positioned at different locations on the autonomous vehicle 400. In addition, alternative methods of propulsion may be utilized. For example, fans, jets, turbojets, turbo fans, jet engines, and the like may be used to propel the autonomous vehicle.

The frame 404 or body of the autonomous vehicle 400 may likewise be of any suitable material, such as graphite, carbon fiber, and/or aluminum. In this example, the frame 404 of the autonomous vehicle 400 includes four rigid members 405-1, 405-2, 405-3, 405-4, or beams arranged in a hash pattern with the rigid members intersecting and joined at approximately perpendicular angles. In this example, rigid members 405-1 and 405-3 are arranged parallel to one another and are approximately the same length. Rigid members 405-2 and 405-4 are arranged parallel to one another, yet perpendicular to rigid members 405-1 and 405-3. Rigid members 405-2 and 405-4 are approximately the same length. In some embodiments, all of the rigid members 405 may be of approximately the same length, while in other implementations, some or all of the rigid members may be of different lengths. Likewise, the spacing between the two sets of rigid members may be approximately the same or different.

While the implementation illustrated in FIG. 4 includes four rigid members 405 that are joined to form the frame 404, in other implementations, there may be fewer or more components to the frame 404. For example, rather than four rigid members, in other implementations, the frame 404 of the autonomous vehicle 400 may be configured to include six rigid members. In such an example, two of the rigid members 405-2, 405-4 may be positioned parallel to one another. Rigid members 405-1, 405-3 and two additional rigid members on either side of rigid members 405-1, 405-3 may all be positioned parallel to one another and perpendicular to rigid members 405-2, 405-4. With additional rigid members, additional cavities with rigid members on all four sides may be formed by the frame 404. As discussed further below, a cavity within the frame 404 may be configured to include an item engagement mechanism for the engagement, transport, and delivery of item(s) and/or containers that contain item(s).

In some implementations, the autonomous vehicle may be configured for aerodynamics. For example, an aerodynamic housing may be included on the autonomous vehicle that encloses the autonomous vehicle control system 410, one or more of the rigid members 405, the frame 404, and/or other components of the autonomous vehicle 400. The housing may be made of any suitable material(s) such as graphite, carbon fiber, aluminum, etc. Likewise, in some implementations, the location and/or the shape of the item engagement mechanism and/or any items or containers may be aerodynamically designed. In some instances, a container may be utilized for holding an item, wherein the item engagement mechanism engages the item by engaging the container. For example, specially shaped containers for use with the autonomous vehicle 400 may be aerodynamically designed and provided in a materials handling facility 230, such that an agent or automated system is able to select one of the containers and place the item in the container for engagement by the autonomous vehicle 400. In some implementations, the item engagement mechanism may be configured such that when an item and/or container is engaged it is enclosed within the frame and/or housing of the autonomous vehicle 400 so that no additional drag is created during transport of the item. In other implementations, the item and/or container may be shaped to reduce drag and provide a more aerodynamic design. For example, if a portion of a container extends below the autonomous vehicle when engaged, the exposed portion of the container may have a curved shape.

The propellers 402 and corresponding propeller motors are positioned at both ends of each rigid member 405. The propeller motors may be any form of motor capable of generating enough speed with the propellers to lift the autonomous vehicle 400 and any engaged item thereby enabling aerial transport of the item. Extending outward from each rigid member is a support arm 406 that is connected to a safety barrier 408. In this example, the safety barrier is positioned around and attached to the autonomous vehicle 400 in such a manner that the motors and propellers 402 are within the perimeter of the safety barrier 408. The safety barrier may be plastic, rubber, etc. Likewise, depending on the length of the support arms 406 and/or the length, number or positioning of the rigid members 405, the safety barrier may be round, oval, or any other shape.

Mounted to the frame 404 is the autonomous vehicle control system 410. In this example, the autonomous vehicle control system 410 is mounted in the middle and on top of the frame 404. The autonomous vehicle control system 410, as discussed in further detail below with respect to FIG. 7, may control the operation, routing, navigation, communication, object sense and avoid, item engagement mechanism, etc. of the autonomous vehicle 400.

The autonomous vehicle 400 also includes one or more power modules 412. In this example, the autonomous vehicle 400 includes two power modules 412 that are removably mounted to the frame 404. The power module for the autonomous vehicle may be in the form of battery power, solar power, gas power, super capacitor, fuel cell, alternative power generation source, or a combination thereof. For example, the power modules 412 may each be a 6000 mAh lithium-ion polymer battery, polymer lithium ion (Li-poly, Li-Pol, LiPo, LIP, PLI, or Lip) battery. The power module(s) 412 are coupled to and provide power for the autonomous vehicle control system 410 and the propeller motors of the propulsion system.

The power modules 412 store energy with corresponding energy levels. In various implementations, the stored energy levels of the power modules 412 may be recharged through various techniques. For example, when an autonomous vehicle lands at a designated network location, the autonomous vehicle may engage with a charging component at the network location that will recharge the power module. As another example, an autonomous vehicle may also or alternatively utilize other techniques for recharging when it has landed at a network location (e.g., utilizing sunlight to recharge through solar panels, utilizing wind to turn a propeller for generating electricity, etc.). In addition, in some implementations, one or more of the power modules may be configured such that it can be autonomously removed and/or replaced with another power module while the autonomous vehicle is landed at a network location.

As mentioned above, the autonomous vehicle 400 may also include an item engagement mechanism 414. The item engagement mechanism may be configured to engage and disengage items and/or containers that hold items. In this example, the item engagement mechanism 414 is positioned within a cavity of the frame 404 that is formed by the intersections of the rigid members 405. The item engagement mechanism may be positioned beneath the autonomous vehicle control system 410. In implementations with additional rigid members, the autonomous vehicle may include additional item engagement mechanisms and/or the item engagement mechanism 414 may be positioned in a different cavity within the frame 404. The item engagement mechanism may be of any size sufficient to securely engage and disengage items and/or containers that contain items. In other implementations, the engagement mechanism may operate as the container, containing the item(s) to be transported. The item engagement mechanism communicates with (via wired or wireless communication) and is controlled by the autonomous vehicle control system 410.

While the implementations of the autonomous vehicle discussed herein utilize propellers to achieve and maintain flight, in other implementations, the autonomous vehicle may be configured in other manners. In one implementation, the autonomous vehicle may include fixed wings and/or a combination of both propellers and fixed wings. For example, the autonomous vehicle may utilize one or more propellers to enable takeoff and landing and a fixed wing configuration or a combination wing and propeller configuration to sustain flight while the autonomous vehicle is airborne.

As will be described in more detail below with respect to FIG. 7, the autonomous vehicle control system 410 may operate in conjunction with or may otherwise utilize or communicate (e.g., via wired and/or wireless communication) with one or more components of the autonomous vehicle management system 226. Likewise, components of the autonomous vehicle management system 226 may generally interact and communicate with the autonomous vehicle control system 410.

Figure 5:
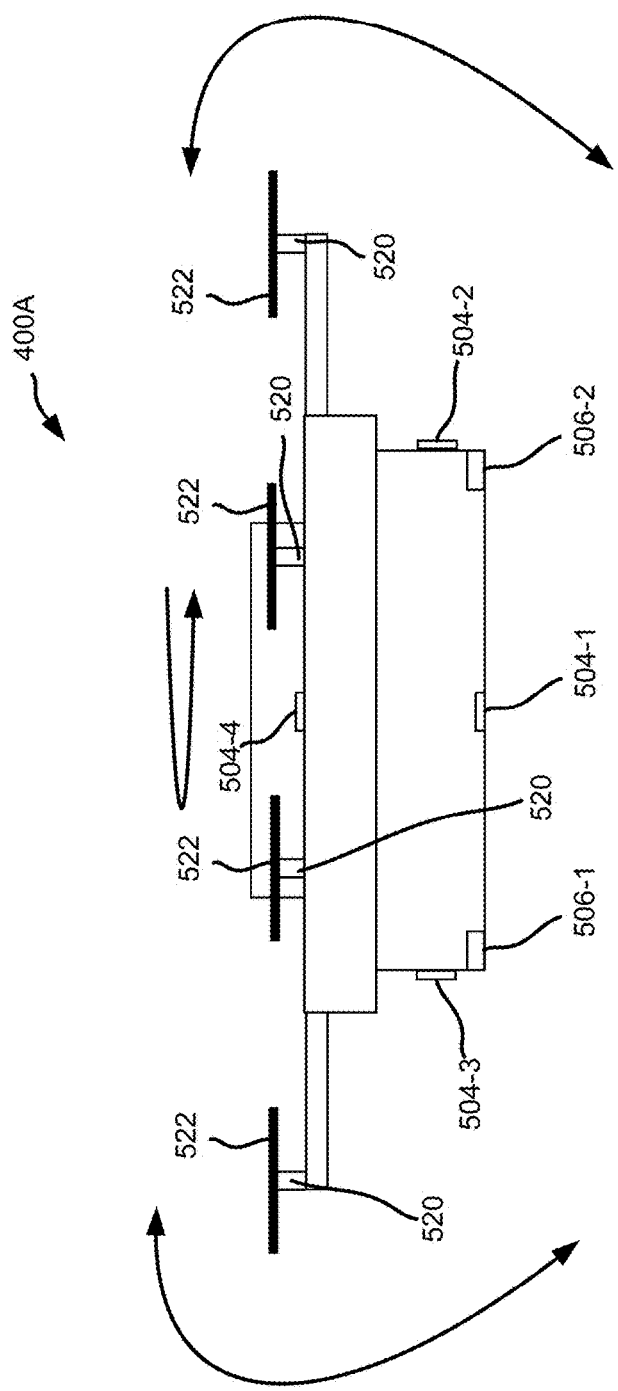
FIG. 5 depicts a block diagram of a side view of an autonomous vehicle, according to an implementation.

FIG. 5 depicts a block diagram of a side view 500 of an autonomous vehicle 400A, according to an implementation. In the side view of the autonomous vehicle illustrated in FIG. 5, four motors 520 and propellers 522 are visible as part of the propulsion system of the autonomous vehicle. In other implementations, additional or fewer motors 520 and/or propellers may be included in the autonomous vehicle 400A. In this example, the motors 520 may all be mounted at 90 degrees with respect to the autonomous vehicle 400A. As will be described in more detail below with respect to FIG. 6, in an alternative implementation the mountings of the motors may be adjustable (e.g., for performing an electricity generation procedure while landed at a network location, for increased maneuverability when transporting an item, landing at a network location, transferring or receiving an item from another autonomous vehicle while in flight, etc.).

For configurations such as that illustrated in FIG. 5 where the propellers are fixed relative to the body of the autonomous vehicle, certain flight and landing maneuvers may be accomplished in some instances by manipulating the pitch, yaw, and/or roll of the autonomous vehicle. It will be appreciated that with autonomous vehicles, such as a quadcopter or an octo-copter, the general direction of travel of the autonomous vehicle may be maintained even though the pitch, yaw, and roll are altered. For example, an autonomous vehicle may be moving north and the yaw may be adjusted so that the autonomous vehicle 400A rotates in a clockwise direction. The rotation can occur without altering the direction of flight. Likewise, the pitch and/or roll can be adjusted without altering the flight path of the autonomous vehicle 400A.

As shown in FIG. 5, various sensors 504 may be mounted to the autonomous vehicle 400A. For example, a sensor 504-1 may be mounted near the bottom of the autonomous vehicle 400A. Similarly, sensors 504-2, 504-3 and 504-4 may be mounted to the front, back and top of the autonomous vehicle 400A, respectively. The sensors 504 may be of various types. For example, the sensor 504-1 may include an imaging sensor that may be utilized to image or scan labels and/or identifying markers (e.g. characters, numbers, bar codes, QR codes, etc.) on an item, network location, other autonomous vehicle, etc. With respect to an item, such labels or markers may more specifically indicate information such as the item's identification, travel path information for the item (e.g., a destination network location), etc. As another example, one or more of the sensors 504 may include airflow sensors, for determining winds relative to the autonomous vehicle, such as may be considered during landing procedures for landing an autonomous vehicle and/or with respect to energy generation procedures, as will be described in more detail below with respect to FIG. 6. In another example, one or more of the sensors 504 may include a distance detection sensor for measuring and monitoring the distance between the autonomous vehicle 400A and other objects (e.g., a network location, an item, another autonomous vehicle, etc.). While the example illustrated in FIG. 5 includes four sensors 504 mounted to the autonomous vehicle 400, in other implementations, fewer or additional sensors may be utilized.

Various charging components 506 may also be provided that may be utilized for recharging the power modules of the autonomous vehicle 400A. For example, charging components 506-1 and 506-2 (e.g., including plugs, sockets, inductive components, etc.) are provided on the bottom of the autonomous vehicle 400A. In various implementations, while the autonomous vehicle 400A is landed at a network location, the charging components 506-1 and 506-2 may couple to corresponding charging components at the network location to provide energy to recharge the power modules of the autonomous vehicle 400A.

Figure 6:
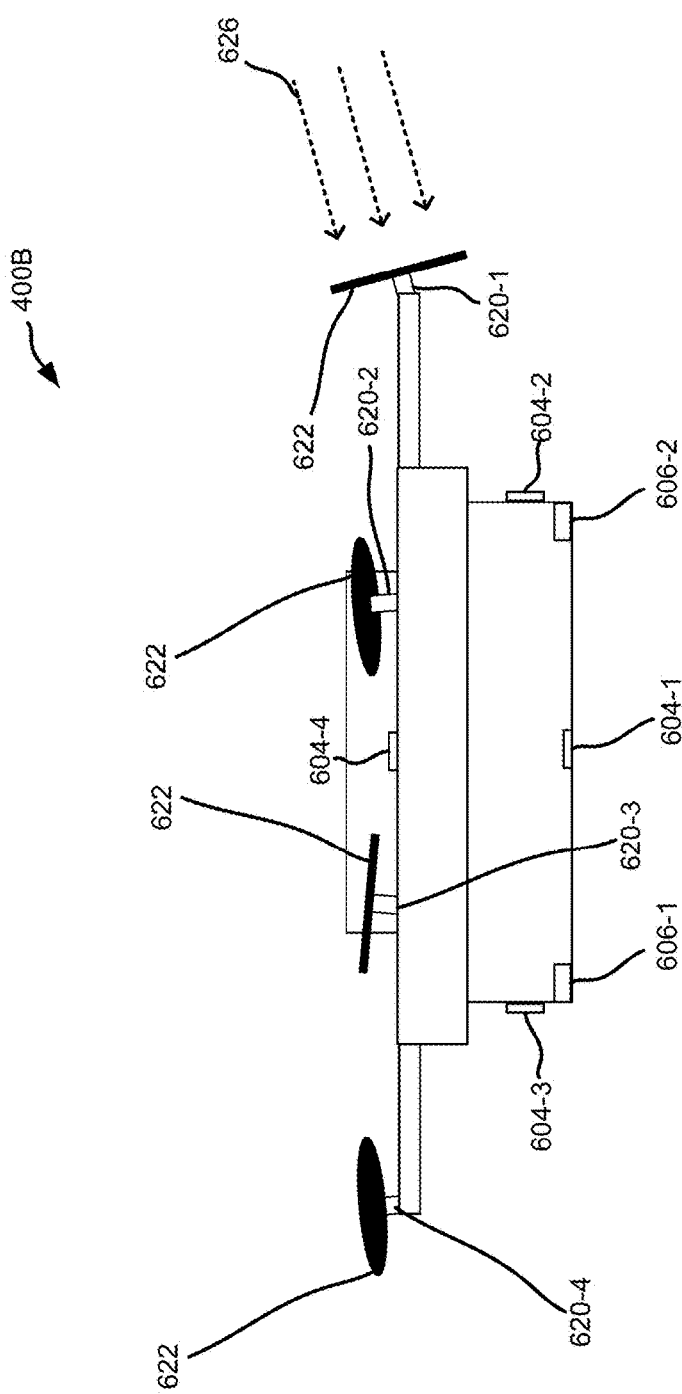
FIG. 6 depicts a block diagram of another side view of an autonomous vehicle, according to an implementation.

FIG. 6 depicts a block diagram of another side view 600 of an autonomous vehicle 400B, according to an implementation. As shown in FIG. 6, four motors 620-1 to 620-4 and corresponding propellers 622 are visible as part of the propulsion system of the autonomous vehicle 400B. In other implementations, additional or fewer motors 620 and/or propellers may be included in the autonomous vehicle 400B. For example, in some implementations, propellers may be mounted in pairs. In addition, four sensors 604-1 to 604-4 and two charging components 606-1 and 606-2 are illustrated as attached to the body of the autonomous vehicle, which may operate similarly to the sensors 504-1 to 504-4 and charging components 506-1 and 506-2 described above with respect to FIG. 5.

In the right side view of FIG. 6, the motor 620-1 is at the front of the autonomous vehicle 400B and the motor 620-4 is at the rear of the autonomous vehicle 400B. The motors 620 and corresponding propellers 622 may have an orientation that is offset in any direction with respect to the body of the autonomous vehicle 400, and the offset may be adjustable. In some implementations, the orientation offset of one or more of the motors 620 may be adjusted while the autonomous vehicle is in operation. For example, during normal flight, all of the motors 620 may be positioned with 0 degrees of offset (e.g., wherein the plane of rotation of the propeller is approximately parallel to a top surface of the body of the autonomous vehicle). When a determination is made that certain types of maneuvers are to be performed (e.g. as part of a landing or obstacle avoidance procedure), the orientation of one or more of the motors 620 and corresponding propellers 622 may be adjusted. In some instances, the orientations of the motors 620 and corresponding propellers 622 may be made to increase the agility of the autonomous vehicle 400B. For example, some of the motors (e.g., 620-2, 620-3 and 620-4) and corresponding propellers 622 may be offset between approximately 0-10 degrees with respect to the body of the autonomous vehicle 400B and/or each other, in order to increase the agility of the autonomous vehicle 400B. Once the maneuvers are complete, the one or more motors 620 and corresponding propellers 622 may be reoriented (e.g., back to a 0 degree offset).

As an example of an electricity generation procedure, the orientation of the motor 620-1 is shown to have been altered such that the corresponding propeller 622 faces an airflow 626 (e.g., from a wind). In one implementation, once the autonomous vehicle has landed at a network location, the orientation of the motor 620-1 and corresponding propeller 622 may be adjusted to the illustrated orientation. In the illustrated orientation, the airflow 626 (e.g., as provided by a wind at the network location) may be utilized to rotate the propeller 622 and correspondingly generate electricity from the motor 620-1.

Figure 7:
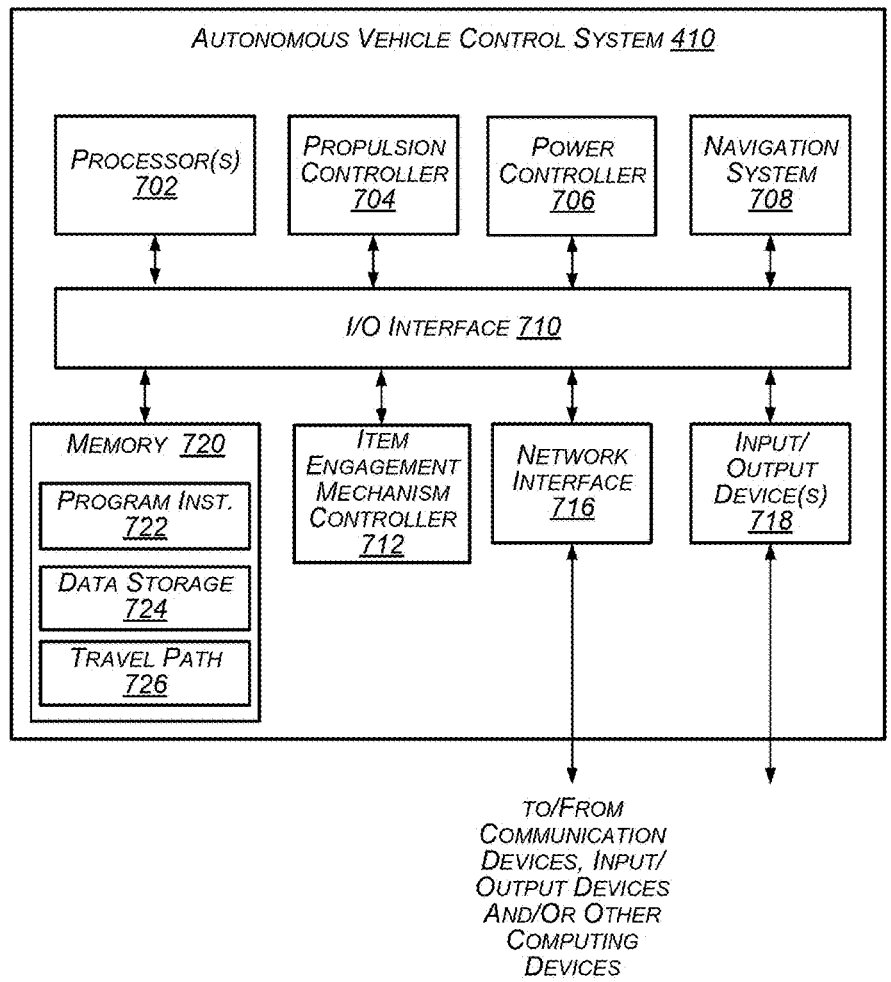
FIG. 7 depicts a block diagram illustrating various components of an autonomous vehicle control system, according to an implementation.

FIG. 7 is a block diagram illustrating an example autonomous vehicle control system 410, such as may be utilized for the autonomous vehicle 400 of FIG. 4, or for other types of autonomous vehicles. In various examples, the block diagram of FIG. 4 may be illustrative of one or more aspects of the autonomous vehicle control system 410 that may be used to implement the various systems and methods discussed herein. In the illustrated implementation, the autonomous vehicle control system 410 includes one or more processors 702 coupled to a non-transitory computer readable storage medium 720 via an input/output (I/O) interface 710. The autonomous vehicle control system 410 may also include a propulsion controller 704 (e.g., for controlling one or more motors, engines, etc.), a power controller 706 (e.g., for controlling, monitoring and/or regulating the use and charging of the power modules and/or electricity generation procedures) and/or a navigation system 708. The autonomous vehicle control system 410 further includes an item engagement mechanism controller 712, a network interface 716, and one or more input/output devices 718.

In various implementations, the autonomous vehicle control system 410 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, travel paths, and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724 and travel path data 726, respectively. In other implementations, program instructions, data, and/or travel paths may be received, sent, or stored upon different types of computer-accessible media, such as non-transitory media, or on similar media separate from the non-transitory computer readable storage medium 720 or the autonomous vehicle control system 410. Generally speaking, a non-transitory, computer readable storage medium may include storage media or memory media such as magnetic or optical media, e.g., disk or CD/DVD-ROM, coupled to the autonomous vehicle control system 410 via the I/O interface 710. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Additionally, in some implementations, some or all of the functionality of the I/O interface 710, such as an interface to the non-transitory computer readable storage medium 720, may be incorporated directly into the processor(s) 702.

The propulsion controller 704 communicates with the navigation system 708 (e.g., for adjusting the power of each propeller motor of the autonomous vehicle 400 of FIG. 4 to guide the autonomous vehicle along a determined travel path). The navigation system 708 may include a global positioning system (GPS), indoor positioning system (IPS), or other similar system and/or sensors that can be used to navigate the autonomous vehicle 400 to and/or from a location. The item engagement mechanism controller 712 communicates with the motor(s) (e.g., a servo motor) used to engage and/or disengage items. For example, when the autonomous vehicle is positioned over a level surface at a delivery location, the item engagement mechanism controller 712 may provide an instruction to a motor that controls the item engagement mechanism to release an item.

The network interface 716 may be configured to allow data to be exchanged between the autonomous vehicle control system 410, other devices attached to a network, such as other computer systems (e.g., remote computing resources 210), and/or with autonomous vehicle control systems of other autonomous vehicles. For example, the network interface 716 may enable wireless communication between the autonomous vehicle 400 and the autonomous vehicle management system 226 that is implemented on one or more of the remote computing resources 210. For wireless communication, an antenna of an autonomous vehicle or other communication components may be utilized. As another example, the network interface 716 may enable wireless communication between numerous autonomous vehicles. In various implementations, the network interface 716 may support communication via wireless general data networks, such as a Wi-Fi network. For example, the network interface 716 may support communication via telecommunications networks such as cellular communication networks, satellite networks, and the like.

In some implementations, input/output devices 718 may include one or more displays, imaging devices, thermal sensors, infrared sensors, time of flight sensors, accelerometers, pressure sensors, weather sensors, etc. Multiple input/output devices 718 may be present and controlled by the autonomous vehicle control system 410. One or more of these sensors may be utilized to assist in the landing as well as the avoidance of obstacles during flight. For example, an imaging sensor may be utilized to assist with a landing of an autonomous vehicle at a network location and/or for determining an identification of an item that is to be transported from the network location.

As shown in FIG. 7, the memory may include program instructions 722 that may be configured to implement the example processes and/or sub-processes described herein. The data storage 724 may include various data stores for maintaining data items that may be provided for determining travel paths, receiving items, landing, identifying locations for engaging or disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the autonomous vehicle control system 410 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The autonomous vehicle control system 410 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated autonomous vehicle control system 410. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the autonomous vehicle control system 410 may be transmitted to the autonomous vehicle control system 410 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other autonomous vehicle control system configurations.

While the functional components of the example autonomous vehicle 400 are discussed herein as part of the autonomous vehicle 400, in other implementations, one or more of the functional components may be distributed and/or implemented as part of the autonomous vehicle management system 226. For example, one or more of the aspects of the program instructions 722 may be implemented as part of the autonomous vehicle management system 226.

Figure 8:
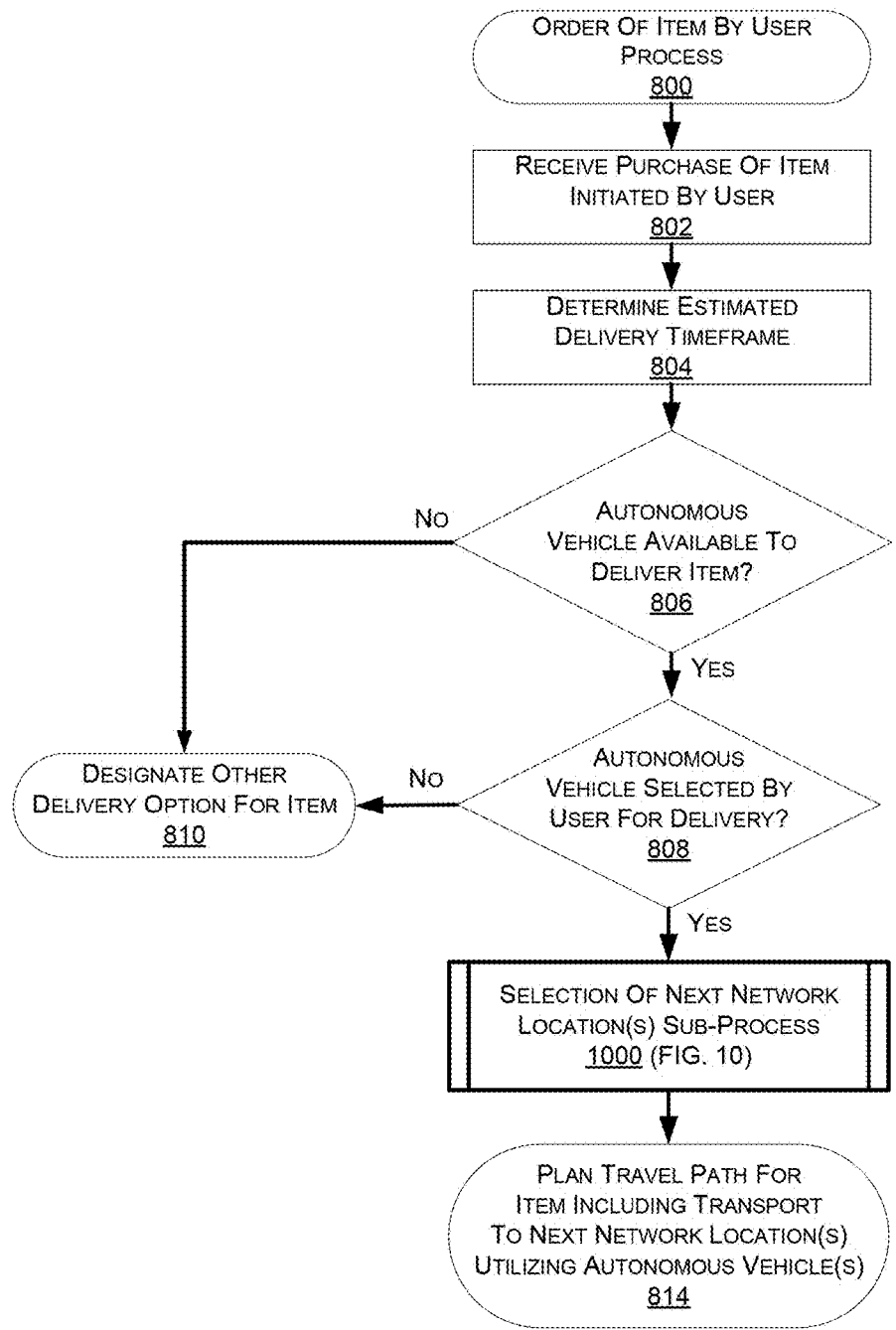
FIG. 8 is a flow diagram illustrating an example process for processing a user order for an item, according to some implementations.

FIG. 8 is a flow diagram illustrating an example process 800 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 800 begins with the receipt of a purchase request initiated by a user, as in 802. Upon receiving a purchase request for an item from a user, a determination is made as to the estimated delivery timeframe for that item, as in 804. In some examples, this may include identifying a materials handling facility (e.g., which may be designated as an origin network location for the item) with the requested item in stock and estimating the time required to fulfill the item to the user. In other implementations, the estimated delivery timeframe may be a set day from the date of the purchase request or a series of days. For example, a user may specify that the delivery timeframe is to be one day from the date of the purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

After the estimated delivery timeframe is determined, a determination is made as to whether an autonomous vehicle is available to deliver the item along a path segment to the user specified delivery location (e.g., a destination network location), as in 806. If it is determined that an autonomous vehicle is available to make the delivery, a determination is made as to whether an autonomous vehicle is selected by the user for the delivery, as in 808. In various implementations, an interaction may be received from a user through a user interface that presents delivery options to the user and receives a selection from the user (e.g., for selecting delivery by an autonomous vehicle or other delivery option). In addition, in various implementations a user may preselect or provide a preference for deliveries by autonomous vehicles or other delivery options. If an autonomous vehicle is not selected by the user for the delivery, as in 808, or if no autonomous vehicle is available to make the delivery, as in 806, another delivery option is designated for the delivery of the item, as in 810.

If an autonomous vehicle is selected by the user for the delivery, a next network location(s) selection sub-process is performed, as in 1000, as will be described in more detail below with respect to FIG. 10. Once the next network location(s) have been selected, a travel path for the item is planned including the selected next network location(s), as in 814. As described above with respect to FIG. 3, when a travel path for an item includes one or more intermediate network locations, the travel path will correspondingly include multiple path segments (e.g., between the different network locations along the travel path). In various implementations, a different autonomous vehicle may be utilized for transporting the item along each path segment from one network location to another. As will be described in more detail below with respect to FIG. 10, various types of transportation factors (e.g., related to travel time, cost, safety, etc.) may be evaluated when selecting a travel path for an item and correspondingly determining which next network locations an item will be routed to. With regard to the selection of the travel path, in various implementations, the entire travel path may be selected before the item departs from the origin network location (e.g., a materials handling facility), or the different path segments may be selected dynamically over time (e.g., with each new path segment selected after a previous path segment is complete).

In various implementations, certain portions of the example process 800 may be performed prior to, or as part of, the purchase of the item by the user at 802. For example, a user who only wants to order an item if the item can be delivered relatively quickly may wish to receive feedback regarding the possible delivery time. Such feedback may include information regarding whether a fast autonomous vehicle is available to deliver the item, and also regarding the route that may be taken and the corresponding expected timing for the delivery, all of which may be determined and indicated to the user prior to when the purchase is confirmed. In various implementations, predictive inventory management or other techniques may also be utilized to increase the likelihood that an autonomous vehicle will be available for delivering an item. For example, items that are expected to be in high demand for delivery by autonomous vehicles (e.g., release day items, etc.) may be moved ahead of time to a location from which autonomous vehicles will be able to deliver the items and/or additional autonomous vehicles may be sent ahead of time to locations where high demand is expected to occur.

Figure 9:
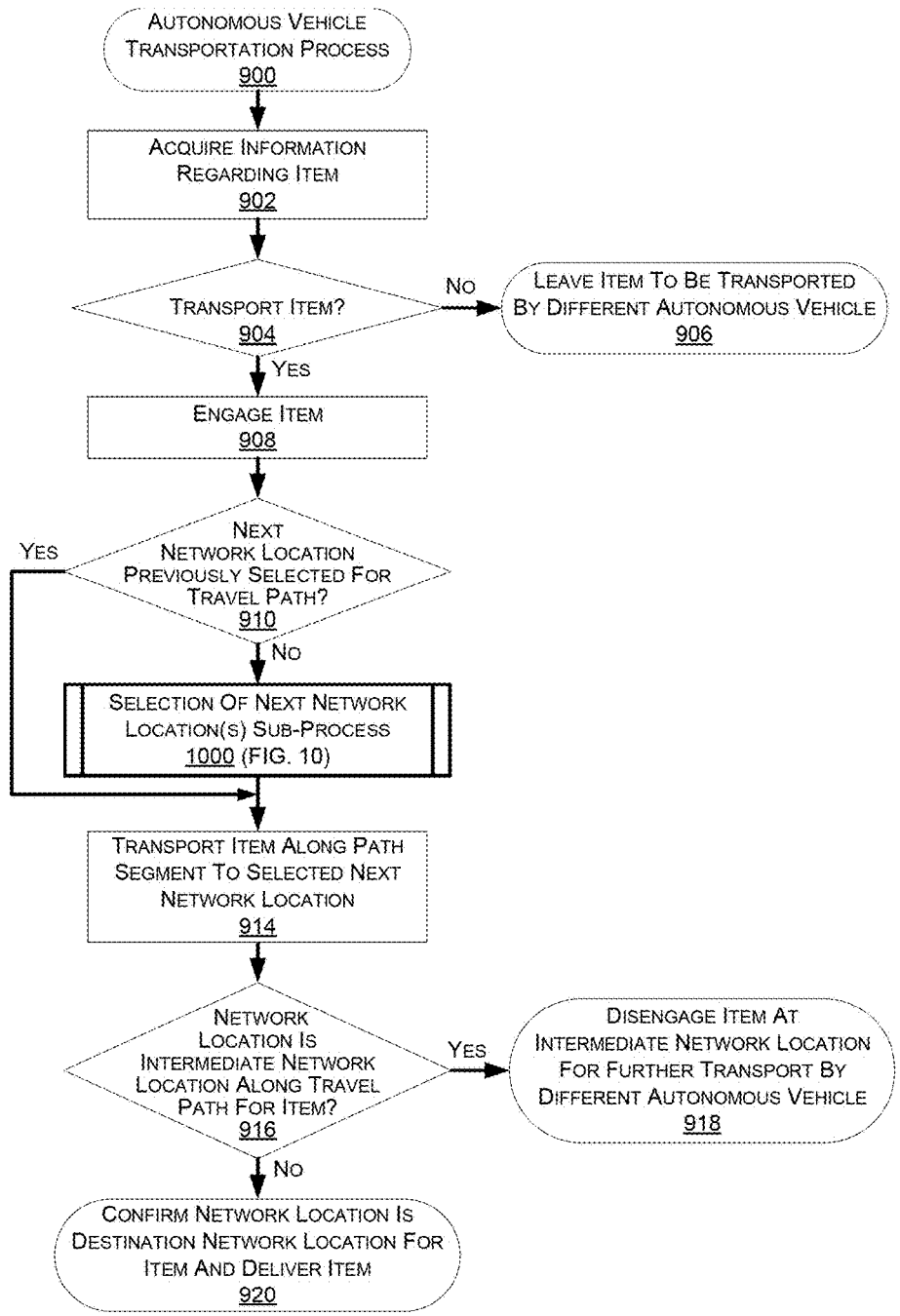
FIG. 9 is a flow diagram illustrating an example process for utilizing an autonomous vehicle for transporting an item, according to some implementations.

FIG. 9 is a flow diagram illustrating an example process 900 for utilizing an autonomous vehicle for transporting an item along a path segment, according to some implementations. The example process begins with the autonomous vehicle acquiring information regarding the item, as in 902.

In various implementations, the item may include visual or electronic identifications or other information. For example, the item may include a label that can be read or otherwise electronically scanned utilizing a sensor of the autonomous vehicle (e.g., an imaging sensor), or may include an RFID tag, etc. Such information may allow the item to be identified and/or may include routing information for the item (e.g., indicating a destination network location for the item, etc.) Alternatively, once the item is identified, a remote computing resource (e.g., the autonomous vehicle management system 226 of FIG. 2) may provide the destination network location and/or other travel path information for the item.

Once the information regarding the item is acquired, a determination is made as to whether the autonomous vehicle will transport the item, as in 904. If the item is not to be transported by the current autonomous vehicle, the item is left at its current location so that it may be transported at a later time by a different autonomous vehicle, as in 906. In various implementations, an item may not be transported at a current time for various reasons. For example, the item may have a lower priority for transport (e.g., a further out delivery date) than other items at the same network location which may have a higher priority for transport (e.g., a more urgent delivery date), and which may thus be transported first. As another example, the item may not be suitable for transport by the current autonomous vehicle (e.g., the item's weight, size, required travel distance to a next network location, etc., may be beyond the capabilities of the current autonomous vehicle).

If the item is to be transported by the current autonomous vehicle, as in 904, the item is engaged by the autonomous vehicle, as in 908. For example, an engagement mechanism (e.g., the engagement mechanism 414 of FIG. 4) may be utilized for engaging the item. Once the item is engaged, a determination is made as to whether a next network location has previously been selected for the travel path of the item, as in 910. If the next network location along the travel path for the item has not previously been selected, a next network location selection sub-process is performed, as in 1000, as will be described in more detail below with respect to FIG. 10. Once the next network location has been selected, as in 1000, or if the next network location was previously selected, as in 910, the autonomous vehicle transports the item along the path segment to the selected next network location, as in 914.

Once the autonomous vehicle has arrived with the item at the next network location, a determination is made as to whether the network location is an intermediate network location along the travel path for the item, as in 916. If the network location is an intermediate network location along the travel path for the item, the autonomous vehicle disengages the item at the intermediate network location so that the item may be further transported by a different autonomous vehicle from the network location, as in 918. For example, the intermediate network location may include a storage area where the autonomous vehicle may drop off the item, and from which the item may be engaged by a different autonomous vehicle for further transport along a next path segment to a next network location. As an alternative to dropping off the item, the intermediate network location may be a meeting location that is established for a meeting of the autonomous vehicle with another autonomous vehicle for transferring the item, as will be described in more detail below with respect to FIG. 11. If the network location is not an intermediate network location, as in 916, a confirmation is made that the network location is a destination network location (e.g., a user specified delivery location) for the item and the item is delivered by the autonomous vehicle, as in 920.

Figure 10:
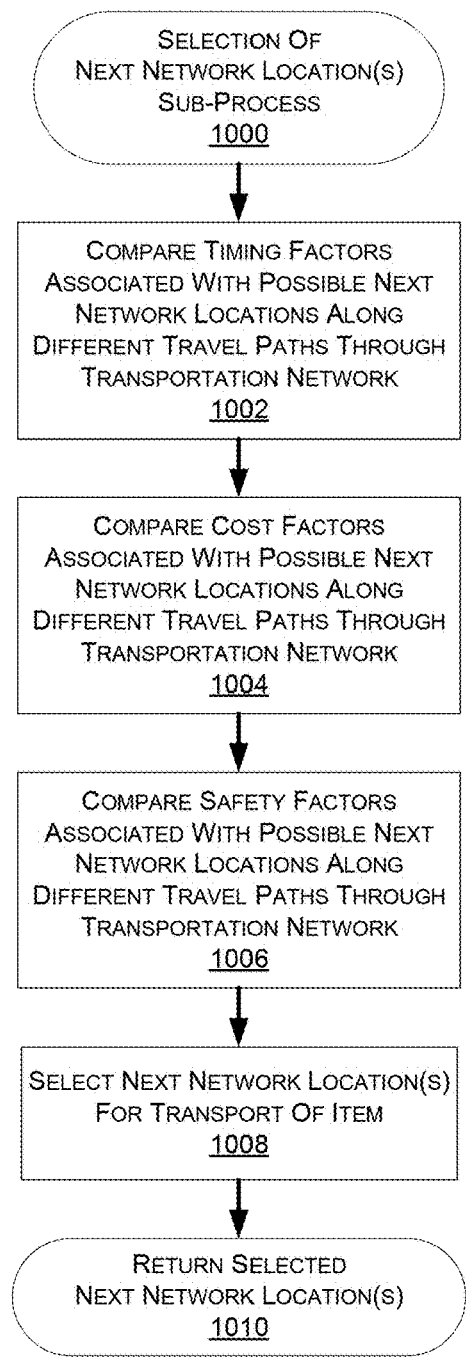
FIG. 10 is a flow diagram illustrating an example subprocess for selecting a next network location along a travel path for transporting an item, according to some implementations.

FIG. 10 is a flow diagram illustrating an example sub-process 1000 for selecting a next network location along a travel path for an item, according to some implementations. The example sub-process begins with a comparison of timing factors associated with possible next network locations along different travel paths through a transportation network, as in 1002. In various implementations, the timing factors may be related to an estimated amount of time that would be associated with transporting the item to the next network locations along the respective possible travel paths for the item. For example, if a relatively constant travel speed is assumed, an estimated amount of time for the travel between different network locations may be approximately proportional to the distances between the network locations. As another example, transportation information may be received that indicates that certain types of conditions (e.g., weather patterns) are occurring that may affect travel times between particular network locations for certain types of autonomous vehicles (e.g., unmanned aerial vehicles).

As another example, transportation information may be received that indicates that congestion or other issues specific to a network location may be occurring, which may influence travel times. One type of congestion that may occur may be related to a number of autonomous vehicles that are available for transporting items from a network location. For example, if an intermediate network location has only a limited number of associated autonomous vehicles for transporting items from the intermediate network location, and if more items are arriving than there are associated autonomous vehicles available, then some items may be required to wait at the intermediate network location for a period of time until an autonomous vehicle is available, which may add to an estimated travel time for an item. As another issue related to congestion, an intermediate network location may have only a limited amount of space for arrivals and departures of autonomous vehicles (e.g., a limited amount of landing and taking off space for unmanned aerial vehicles), in which case if too many autonomous vehicles are attempting to arrive or depart at the same time, some autonomous vehicles may be required to wait, which may further add to an estimated travel time for an item.

In various implementations, certain types of planning techniques, algorithms, etc. may be utilized to help address issues with certain types of transportation factors (e.g., timing factors). For example, updated transportation information (e.g., regarding certain types of timing factors that are affected by issues such as congestion occurring at intermediate network locations, current weather conditions, etc.) may be utilized for selecting different travel paths including different intermediate network locations, so as to both improve the estimated travel times for items, and to help reduce the congestion that is occurring at particular intermediate network locations in the transportation network. Previously planned travel paths may also be altered to avoid congested intermediate network locations based on such updated transportation information. In this manner, the transportation network may generally be made to operate more efficiently, with a faster average travel time for the items that are transported through the transportation network. In various implementations, such improvements in efficiency may result in fewer autonomous vehicles being required for transporting a similar number of items.

Once the timing factors have been compared, as in 1002, cost factors are compared as associated with possible next network locations along different travel paths through the transportation network, as in 1004. In various implementations, cost factors may be associated with the amount of energy or other resources utilized by autonomous vehicles for transporting items. For example, a longer overall travel path for an item may generally require more energy consumption and a higher associated cost than a shorter travel path. As another example, in some instances different types of autonomous vehicles may be utilized (e.g., some network locations may only be reachable by certain types of autonomous vehicles), and the different types of autonomous vehicles may be associated with different travel costs (e.g., more expensive transportation vehicles may be associated with higher depreciation costs, etc.). As another example, in some instances smaller and/or slower autonomous vehicles may generally be associated with lower travel costs than larger and/or faster autonomous vehicles (e.g., due to higher energy consumption, etc.).

Once the cost factors are compared, safety factors are compared as associated with possible next network locations along different travel paths through the transportation network, as in 1006. In various implementations, the safety factors may be related to the particular types of autonomous vehicles that are being utilized. For example, when an autonomous vehicle is an unmanned aerial vehicle, certain types of weather conditions may be considered unsafe for flying. As another example, certain types of travel may be undesirable due to concerns for human safety (e.g., flying an unmanned aerial vehicle in a crowded area).

Once the safety factors have been compared, a selection is made of the next network location(s) for the transport of the item, as in 1008. In various implementations, the selection process may seek to determine an optimized travel path through the transportation network that may include routing through various network locations based at least in part on the previously described transportation factors. As part of such optimization considerations, the selection may be made based primarily on one or more of the previously described factors (e.g., timing, cost, safety) or other factors, or may be made based on a combination of such factors. For example, each of the transportation factors may be assigned a weighted value, for which the selection of the next network location(s) along a travel path for the item may be made based on an optimized combination of the transportation factors. In various implementations, optimization techniques may be utilized that also include different types of evaluations for different types of transportation factors. For example, one optimization method may include searching for the lowest combined cost factors for the next network location(s), but also requiring that the associated timing factors will meet a specified delivery deadline. Once the selection has been made, the selected next network location(s) are returned, as in 1010.

In various implementations, the example sub-process 1000 may also or alternatively include consideration of other types of factors. For example, feasibility factors may initially be determined with regard to possible next network locations along different travel paths through the transportation network. The feasibility factors may be related to a determination of whether or not it is feasible to transport an item to a next network location. For example, a next network location may be too far away for any currently available autonomous vehicle to transport the item, in which case the next network location may be eliminated from consideration.

Figure 11:
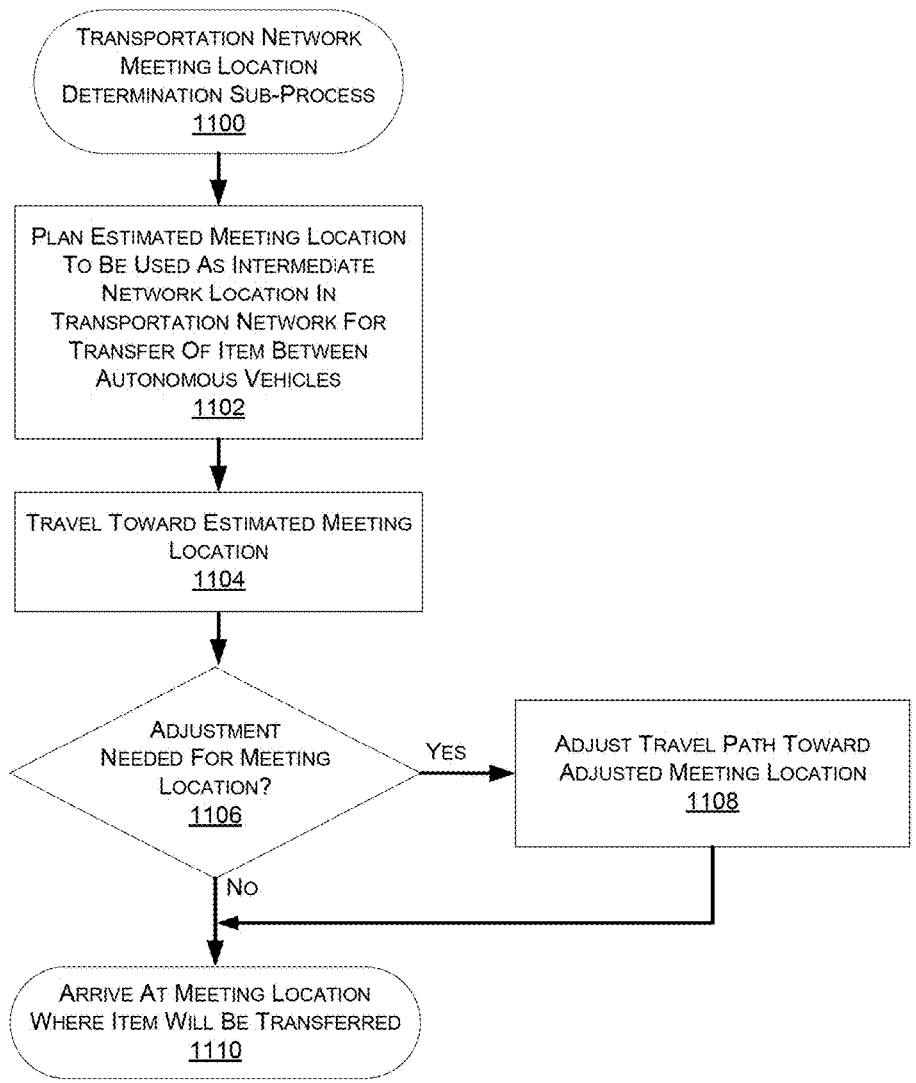
FIG. 11 is a flow diagram illustrating an example process for determining a meeting location to be used as an intermediate network location for transferring an item from one autonomous vehicle to another, according to some implementations.

FIG. 11 is a flow diagram illustrating an example process 1100 for determining a meeting location to be used as an intermediate network location for transferring an item from one autonomous vehicle to another, according to some implementations. The example sub-process begins with planning an estimated meeting location that will be utilized for the transfer of an item between autonomous vehicles, as in 1102. In various implementations, a transportation network utilizing certain types of autonomous vehicles (e.g., unmanned aerial vehicles) may include a number of previously approved meeting locations (e.g., on certain rooftops, cell towers, etc.), or other types of dynamic meeting locations may be determined (e.g., for in-flight transfers, etc.). In various implementations, the planning of the estimated meeting location may involve coordination between the autonomous vehicles. For example, one or both of the autonomous vehicles may transmit current travel paths or other relevant travel information to be utilized for determining the estimated meeting location. As part of the coordination process, one or both of the autonomous vehicles may also transmit a suggested meeting location (e.g., one autonomous vehicle may send a communication including a suggested meeting location and the other autonomous vehicle may respond with a communication including either a confirmation or else a suggested alternative meeting location, etc.)

Once the estimated meeting location has been planned, the autonomous vehicle may travel toward the estimated meeting location, as in 1104. It will be appreciated that one or both of the autonomous vehicles that are meeting may be simultaneously traveling toward the meeting location, or alternatively one of the autonomous vehicles may be stationary while the other is traveling toward it. As one or both of the autonomous vehicles are traveling toward the estimated meeting location, a determination is made as to whether an adjustment is needed for the meeting location, as in 1106. For example, if both of the autonomous vehicles are traveling and if the actual travel speed or route of either autonomous vehicle is different than was expected, an adjustment to the meeting location may be needed.

If an adjustment is needed for the meeting location, the travel path is adjusted toward the adjusted meeting location, as in 1108. Once the travel path has been adjusted, as in 1108, or if the meeting location does not need adjustment, as in 1106, the autonomous vehicle arrives at the meeting location where the item will be transferred, as in 1110. In various implementations, the transfer of the item may include a particular procedure by each of the autonomous vehicles. For example, the autonomous vehicle that has transported the item to the meeting location may control an engagement mechanism to disengage the item, while the autonomous vehicle that is to receive the item at the meeting location may control an engagement mechanism to engage the item.

Figure 12:
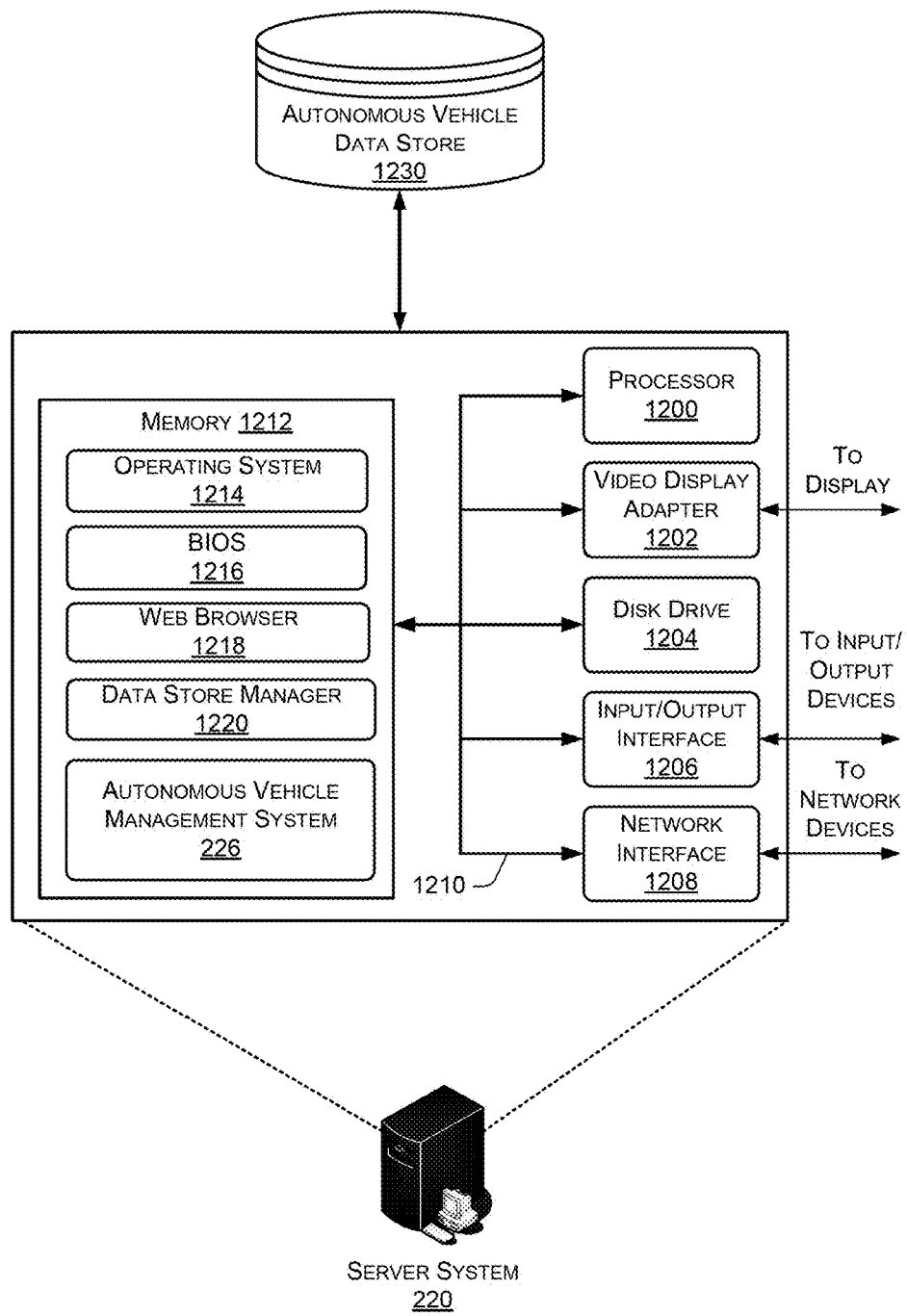
FIG. 12 is a block diagram of an illustrative implementation of a server system that may be used with various implementations.

FIG. 12 is a block diagram of an illustrative implementation of a server system, such as the server system 220, which may be used in the implementations described herein. The server system 220 may include a processor 1200, such as one or more redundant processors, a video display adapter 1202, a disk drive 1204, an input/output interface 1206, a network interface 1208, and a memory 1212. The processor 1200, the video display adapter 1202, the disk drive 1204, the input/output interface 1206, the network interface 1208, and the memory 1212 may be communicatively coupled to each other by a communication bus 1210.

The video display adapter 1202 provides display signals to a local display (not shown in FIG. 12) permitting an agent of the server system 220 to monitor and configure operation of the server system 220 and/or to provide information (e.g., regarding the operations of autonomous vehicles 400, etc.). The input/output interface 1206 likewise communicates with external input/output devices not shown in FIG. 12, such as a mouse, keyboard, scanner, or other input and output devices that can be operated by an agent of the server system 220. The network interface 1208 includes hardware, software, or any combination thereof, to communicate with other computing devices. For example, the network interface 1208 may be configured to provide communications between the server system 220 and other computing devices, such as that of an autonomous vehicle 400, autonomous vehicle management system 226, etc., via a network.

The memory 1212 generally comprises random access memory (RAM), read-only memory (ROM), flash memory, and/or other volatile or permanent memory. The memory 1212 is shown storing an operating system 1215 for controlling the operation of the server system 220. A binary input/output system (BIOS) 1216 for controlling the low-level operation of the server system 220 is also stored in the memory 1212.

The memory 1212 additionally stores program code and data for providing network services to the autonomous vehicle 400, autonomous vehicle management system 226, etc. Accordingly, the memory 1212 may store a browser application 1218. The browser application 1218 comprises computer executable instructions, that, when executed by the processor 1200 generate or otherwise obtain configurable markup documents such as Web pages. The browser application 1218 communicates with a data store manager application 1220 to facilitate data exchange between the data store 209 and the autonomous vehicles 400, the autonomous vehicle management system 226, etc.

As used herein, the term "data store" refers to any device or combination of devices capable of storing, accessing, and retrieving data, which may include any combination and number of data servers, databases, data storage devices and data storage media, in any standard, distributed or clustered environment. The server system 220 can include any appropriate hardware and software for integrating with the data store 209 as needed to execute aspects of one or more applications for an autonomous vehicle 400, autonomous vehicle management system 226, etc.

The data store 209 can include several separate data tables, databases or other data storage mechanisms and media for storing data relating to a particular aspect. For example, the illustrated data store 209 includes mechanisms for maintaining information related to operations, inventory, maps, GPS data, autonomous vehicles and associated travel paths, etc., which can be used to generate and deliver information to an autonomous vehicle 400, autonomous vehicle management system 226, agents, etc. It should be understood that there may be additional aspects that can be stored in the data store 209 and that additional data stores beyond the one illustrated may be included. The data store 209 is operable, through logic associated therewith, to receive instructions from the server system 220 and obtain, update or otherwise process data in response thereto.

The memory 1212 may also include the autonomous vehicle management system 226, discussed above. The autonomous vehicle management system 226 may be executable by the processor 1200 to implement one or more of the functions of the server system 220. In one implementation, the autonomous vehicle management system 226 may represent instructions embodied in one or more software programs stored in the memory 1212. In another implementation, the autonomous vehicle management system 226 can represent hardware, software instructions, or a combination thereof.

The server system 220, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction in FIG. 12 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to transport items, the system comprising:
   first and second autonomous vehicles configured to transport items between network locations in a transportation network, the first autonomous vehicle comprising:
   a propulsion system; and an autonomous vehicle control system configured to control the propulsion system, the autonomous vehicle control system comprising:
one or more processors; and
a memory coupled to the one or more processors and storing program instructions that when executed by the one or more processors cause the one or more processors to at least:
determine a plurality of different possible next network locations that an item may to be transported to as part of a travel path for the item through the transportation network;
determine, for each of the plurality of different possible next network locations, one or more transportation factors;
select a next network location based on the one or more transportation factors, wherein the selected next network location is an intermediate network location along the travel path for the item for which the transport of the item includes transport along a first path segment to the intermediate network location by the first autonomous vehicle and transport along a second path segment from the intermediate location by the second autonomous vehicle; and
control the propulsion system to transport the item along the first path segment to the intermediate network location so that the second autonomous vehicle is able to further transport the item from the intermediate network location along the second path segment as controlled by an autonomous vehicle control system of the second autonomous vehicle.

2. The system of claim 1, wherein the program instructions when executed by the one or more processors further cause the one or more processors to receive transportation information from the second autonomous vehicle that is utilized to determine at least one of the transportation factors.

3. The system of claim 1, wherein the program instructions when executed by the one or more processors further cause the one or more processors to receive transportation information from the intermediate network location that is utilized to determine at least one of the transportation factors.

4. The system of claim 1, wherein the program instructions when executed by the one or more processors further cause the one or more processors to select the next network location from the plurality of different possible next network locations and to control the propulsion system to transport the item along the first path segment using the local processing of the autonomous vehicle control system without waiting for instructions from a centralized system component.

5. The system of claim 1, wherein the first and second autonomous vehicles are unmanned aerial vehicles.

6. An autonomous vehicle configured to transport an item between network locations in a transportation network, the autonomous vehicle comprising:
a propulsion system;
an engagement mechanism to engage an item; and
an autonomous vehicle control system configured to control the propulsion system and the engagement mechanism, the autonomous vehicle control system comprising:
one or more processors; and
a memory coupled to the one or more processors and storing program instructions that when executed by the one or more processors cause the one or more processors to at least:
control the engagement mechanism to engage an item;
determine a next network location to transport the item to based at least in part on one or more transportation factors, wherein the next network location is an intermediate network location from which the item will be further transported by
a second autonomous vehicle;
control the propulsion system to transport the item to the intermediate network location; and
control the engagement mechanism to disengage the item at the intermediate network location so that the second autonomous vehicle may transport the item from the intermediate network location as controlled by an autonomous vehicle control system of the second autonomous vehicle.

7. A computer implemented method to transport items, the computer implemented method comprising:
under control of one or more computing systems configured with executable instructions,
determining a plurality of possible next network locations that an item may be transported to as part of a travel path through a transportation network, the travel path beginning at an origin network location and ending at a destination network location for the item, wherein the travel path includes at least two path segments with a different autonomous vehicle utilized to transport the item along each path segment, each of the autonomous vehicles having an autonomous vehicle control system;
receiving transportation information that is related to transport of the item to at least one of the possible next network locations; and
selecting a next network location from the plurality of possible next network locations for the item to be transported to based at least in part on the received transportation information.

8. The computer implemented method of claim 7, wherein the selected next network location is an intermediate network location and the transport of the item includes transport along a first path segment to the intermediate network location by a first autonomous vehicle having a first autonomous vehicle control system and transport along a second path segment from the intermediate location by a second autonomous vehicle having a second autonomous vehicle control system.

9. The computer implemented method of claim 8, wherein the first autonomous vehicle includes the one or more computing systems configured with the executable instructions.

10. The computer implemented method of claim 8, wherein the second autonomous vehicle includes a power module and a charging component that couples to a corresponding charging component at the intermediate network location to provide energy to recharge the power module of the second autonomous vehicle.

11. The computer implemented method of claim 10, further comprising, after selecting the intermediate network location, directing the second autonomous vehicle to travel to the intermediate network location before the item is transported to the intermediate network location and to utilize the charging component of the second autonomous vehicle to recharge the power module in preparation for transporting the item from the intermediate network location.

12. The computer implemented method of claim 7, wherein the selected next network location is a first intermediate network location and the received transportation information indicates that at least one of congestion or inclement weather is occurring at a second intermediate network location that is one of the plurality of possible next network locations, on the basis of which the first intermediate network location is selected over the second intermediate network location.

13. The computer implemented method of claim 7, wherein the selected next network location is a first intermediate network location and the received transportation information indicates that at least one of congestion or inclement weather is not occurring at the first intermediate network location, on the basis of which the first intermediate network location is selected over a second intermediate network location that is one of the plurality of possible next network locations.

14. The autonomous vehicle of claim 6, wherein at least one of the transportation factors is related to an estimated amount of travel cost that would be associated with the autonomous vehicle transporting the item to the intermediate network location.

15. The autonomous vehicle of claim 6, wherein the transportation network includes a plurality of possible next network locations that the item may be transported to and the program instructions when executed by the one or more processors further cause the one or more processors to determine the next network location that the item will be transported to by selecting the next network location from the plurality of possible next network locations based at least in part on the one or more transportation factors.

16. The autonomous vehicle of claim 15, wherein at least one of the transportation factors is related to a level of congestion that is occurring at one of the possible next network locations.

17. The autonomous vehicle of claim 16, wherein the program instructions when executed by the one or more processors further cause the one or more processors to change a previously planned travel path for the item that included the possible next network location where the congestion is occurring to no longer include the possible next network location where the congestion is occurring.

18. The autonomous vehicle of claim 16, wherein the program instructions when executed by the one or more processors further cause the one or more processors to receive transportation information that indicates the level of congestion that is occurring at the possible next network location, and the transportation information is received from at least one of another autonomous vehicle or the possible next network location where the congestion is occurring.

19. The autonomous vehicle of claim 6, wherein at least one of the transportation factors is related to an estimated amount of travel time it would take for the item to be transported to the intermediate network location by the autonomous vehicle.

20. The system of claim 1, wherein the first and second autonomous vehicles primarily utilize ground travel to transport items.

\* \* \* \* \*